(12) United States Patent
Szczepkowski et al.

(10) Patent No.: US 8,924,663 B2
(45) Date of Patent: Dec. 30, 2014

(54) STORAGE SYSTEM, COMPUTER-READABLE MEDIUM, AND DATA MANAGEMENT METHOD HAVING A DUPLICATE STORAGE ELIMINATION FUNCTION

(75) Inventors: Jerzy Szczepkowski, Warsaw (PL); Michal Welnicki, Warsaw (PL); Cezary Dubnicki, Warsaw (PL)

(73) Assignee: NEC Corporation, Tokyo (JP)

( * ) Notice: Subject to any disclaimer, the term of this patent is extended or adjusted under 35 U.S.C. 154(b) by 154 days.

(21) Appl. No.: 13/640,628

(22) PCT Filed: Aug. 25, 2011

(86) PCT No.: PCT/JP2011/004722
§ 371 (c)(1),
(2), (4) Date: Oct. 11, 2012

(87) PCT Pub. No.: WO2012/032727
PCT Pub. Date: Mar. 15, 2012

(65) Prior Publication Data
US 2013/0036277 A1 Feb. 7, 2013

(51) Int. Cl.
*G06F 12/00* (2006.01)
*G06F 3/06* (2006.01)
*G06F 12/08* (2006.01)

(52) U.S. Cl.
CPC .......... *G06F 3/0641* (2013.01); *G06F 12/0811* (2013.01); *G06F 3/0683* (2013.01); *G06F 3/0608* (2013.01); *G06F 3/0685* (2013.01)
USPC ........................... 711/159; 711/103; 711/119

(58) Field of Classification Search
CPC . G06F 12/0811; G06F 3/0641; G06F 3/0683; G06F 3/0685
USPC .......................................................... 711/159
See application file for complete search history.

(56) References Cited

U.S. PATENT DOCUMENTS 6,732,124 B1 5/2004 Koseki et al.
2003/0065898 A1* 4/2003 Flamma et al. ............... 711/165
(Continued)

FOREIGN PATENT DOCUMENTS

EP 2063351 A2 5/2009
JP 2000-284995 A 10/2000
(Continued)

OTHER PUBLICATIONS

Benjamin Zhu et al., "Avoiding the Disk Bottleneck in the Data Domain Deduplication File System", 6th USENIX Conference on File and Storage Technologies, 2008, pp. 269-282.

(Continued)

*Primary Examiner* — April Y Blair
*Assistant Examiner* — Prasith Thammavong
(74) *Attorney, Agent, or Firm* — Sughrue Mion, PLLC

(57) ABSTRACT

The storage system includes a first auxiliary storage device, a second auxiliary storage device, and a main storage device, and also includes a data management unit which stores and keeps, in the main storage device, index data based on feature data by referring to the feature data of storage target data stored in the first auxiliary storage device, and if the index data stored and kept in the main storage device reaches a preset amount, stores and keeps, in the second auxiliary storage device, the index data stored and kept in the main storage device, and deletes the index data stored and kept in the second auxiliary storage device from the main storage device.

6 Claims, 20 Drawing Sheets

(56) References Cited

U.S. PATENT DOCUMENTS

| | | | |
|---|---|---|---|
| 2003/0200388 A1* | 10/2003 | Hetrick | 711/114 |
| 2006/0004957 A1* | 1/2006 | Hand et al. | 711/113 |
| 2007/0208788 A1 | 9/2007 | Chakravarty et al. | |
| 2009/0254507 A1* | 10/2009 | Hosoya et al. | 706/48 |
| 2010/0064166 A1 | 3/2010 | Dubnicki et al. | |
| 2011/0035548 A1 | 2/2011 | Kimmel et al. | |

FOREIGN PATENT DOCUMENTS

| | | |
|---|---|---|
| JP | 2007-234026 A | 9/2007 |
| JP | 2008-269520 A | 11/2008 |
| JP | 2010-79886 A | 4/2010 |
| WO | 2009/102425 A1 | 8/2009 |

OTHER PUBLICATIONS

Sean Rhea et al., "Fast, Inexpensive Content-Addressed Storage in Foundation", Proceedings of the 2008 USENIX Annual Technical Conference, 2008, pp. 143-156.

Biplon Debnath et al., "ChunkStash: Speeding up Inline Storage Deduplication using Flash Memory", 2010 USENIX Annual Technical Conference, 2010, 15pgs.

Dirk Meister et al., "dedupv1: Improving Deduplication Throughput using Solid State Drives (SSD)", Proceedings of the 26th IEEE Symposium on Massive Storage Systems and Technologies, 2010, 6pgs.

Sean Quinlan et al., "Venti: a new approach to archival storage", First USENIX conference on File and Storage Technologies, 2002, pp. 89-101.

Jiansheng Wei et al., "MAD2: A Scalable High-Throughput Exact Deduplication Approach for Network Backup Services", Proceedings of the 26th IEEE Symposium on Massive Storage Systems and Technologies, 2010, 14pgs.

Mark Lillibridge et al., "Sparse Indexing: Large Scale, Inline Deduplication Using Sampling and Locality", 7th USENIX Conference on file and Storage Technologies, 2009, pp. 111-123.

Deepavali Bhagwat et al., "Extreme Binning: Scalable, Parallel Deduplication for Chunk-based File Backup", IEEE, 2009, 9pgs.

Tianming Yang et al., "DEBAR: A Scalable High-Performance Deduplication Storage Syatem for Backup and Archiving", Technical Report, University of Nebraska, 2009, 20pgs.

Austin T. Clements et al., "Decentralized Deduplication in SAN Cluster File Systems", Proceedings of the USENIX Annual Technical Conference, 2009, 14pgs.

Salil Gokhale et al., "KVZone and the Search for a Write-Optimized Key-Value Store", USENIX 2nd Workshop on Hot Topics in Storage and File Systems (HotStorage '10), 2010, pp. 1-5.

Shaoyi Yin et al., "PBFilter: Indexing Flash-Resident Data through Partitioned Summaries", Research Report RR-6548, INRIA, 2008, 24pgs.

Shaoyi Yin et al., "PBFilter: Indexing Flash-Resident Data through Partitioned Summaries", CIKM, 2008, pp. 1333-1334.

Fay Chang et al., "Bigtable: A Distributed Storage System for Structured Data", 7th USENIX Symposium on Operating Systems Design and Implementation, 2006, pp. 205-218.

Sang-Won Lee et al., "Design of Flash-Based DBMS: An In-Page Logging Approach", SIGMOD, 2007, pp. 55-66.

Tian-Ming Yang et al., "Scalable high Performance de-duplication backup via hash join", Journal of Zhejiang University—Science C 11, 5, 2010, pp. 315-327.

International Search Report for PCT/JP2011/004722 dated Oct. 18, 2011.

Extended European Search Report, dated Feb. 27, 2014, issued by the European Patent Office, in counterpart Application No. 11823208.1.

Anton, Multi-Level Cache for Deduplication (L1 in RAM and L2 on SSD), May 19, 2010, XP055102401, 6 pages.

* cited by examiner

Fig. 4

| λ | SSD space needed | cache size | relative cost | SSD utiliz. |
|---|---|---|---|---|
| – | – | 16GB | 500 | – |
| 1 | 16GB | 3.84GB | 164 | 5% |
| 2 | 32GB | 1.92GB | 148 | 10% |
| 4 | 64GB | 0.96GB | 206 | 20% |

Fig. 6

| | write cache in RAM | $n_3$-write caches on SSD (level-3 only) | $n_2$-write caches on SSD w/RAM bloom filters (level-2 only) | 3-level write cache (generic) | 3-level with $\gamma = 0.2$, $n_2 = 4$ and $n_3 = 2$ |
|---|---|---|---|---|---|
| # of entries in write cache | $k$ | $k$ | $k$ | $k$ | $k$ |
| # of entries of RAM part of write cache | $k$ | $\dfrac{k}{(n_3+1)}$ | $\dfrac{k}{(n_2+1)}$ | $\dfrac{k}{(n_2+1)(n_3+1)}$ | $\dfrac{k}{15}$ |
| RAM consumption (entries & bloom filters) | $ak$ | $\dfrac{ak}{(n_3+1)}$ | $\dfrac{ak}{(n_2+1)}\left(1+\dfrac{n_2}{8}\right)$ | $\dfrac{ak}{(n_2+1)(n_3+1)}\left(1+\dfrac{n_2}{8}\right)$ | $\dfrac{ak}{10}$ |
| average # of SSD reads from write cache for negative answer | 0 | $\dfrac{n_3}{2}$ | $\dfrac{1\% \bullet n_2}{2}$ | $\dfrac{n_3}{2} + \dfrac{1\% \bullet n_2}{2}$ | 1.02 |
| average # of SSD reads from write cache for positive answer | 0 | $\gamma\dfrac{n_3+2}{3}$ | $\dfrac{1\% \bullet n_2}{2}$ | $\gamma\dfrac{n_3+2}{3} + \dfrac{1\% \bullet n_2}{2}$ | 0.287 |

Fig. 10

|        | RAM usage | SSD usage | overall cost |
|--------|-----------|-----------|--------------|
| DD     | 2.3GB     | 0         | $72          |
| CS     | 10GB      | 75GB      | $519         |
| SSDI   | 4GB       | 16GB+75GB | $376         |
| SSDI-3lvl | 0.4GB  | 20GB+75GB | $274         |

Fig. 11

| | life time | flash endurance | write cache size | SSD utilization by sweeps | hash table size | SSD capacity ($\lambda=1$) |
|---|---|---|---|---|---|---|
| SSDI | 6y | 10k | 3.84GB | 5% | 16GB | 16GB+75GB (metadata files) |
| DDv1 | 6y | 10k | 24GB | 31.25% | 100GB | 100GB |

STORAGE SYSTEM, COMPUTER-READABLE MEDIUM, AND DATA MANAGEMENT METHOD HAVING A DUPLICATE STORAGE ELIMINATION FUNCTION

TECHNICAL FIELD

The present invention relates to a storage system, and in particular, to a storage system having a duplicate storage elimination function.

BACKGROUND ART

Over the last few years, data deduplication has become one of the most widely researched topics in the field of storage systems. It enables significant savings as the required storage space can be reduced up to 20 times, especially for backup usage. In addition to capacity optimization, deduplication may also optimize write bandwidth. If a system provides inline deduplication (performed during writing data) and verifies equality of chunks by comparing their hashes only, the data of duplicated chunks do not need to be stored on disk or even transmitted through network. However, providing an effective way to identify duplicates is not simple.

Consider a sample single-node disk-based storage system with reliable, inline deduplication. We assume a 2u storage node with 12 1 TB disks for a total of 12 TB disk space per node. Deduplication is done on chunk level by comparing hashes of their content. Related work indicated a chunk size of 8 kB as a reasonable choice. To provide deduplication with this chunk size, we need a dictionary for 1.5 billion entries. Keeping only hashes for them will consume 30 GB for SHA-1 or 50 GB for SHA-256, and will not fit into RAM of a reasonable size.

Current systems implement the dictionary as a disk-resident hash table. However, hashes of data chunks are uniformly distributed and there is no locality while accessing them. This makes straight caching ineffective and causes random reads from disks during lookup. NPL 1 and 2 suggest a combination of two optimization techniques.

1. To avoid disk access during lookup of chunks not present in the system, all hashes are summarized in an in-memory bloom filter. This speeds up negative answers.

2. Prefetch assumes that the order of writing duplicates will be the same as the order of writing original chunks. Hashes are additionally kept in special files which reflect the order they were initially written. This speeds up positive answers, but only if the order is preserved.

CITATION LIST

Non Patent Literature

NPL 1: ZHU, B., LI, K., AND PATTERSON, H. Avoiding the disk bottleneck in the data domain deduplication file system. In FAST'08: Proceedings of the 6th USENIX Conference on File and Storage Technologies (Berkeley, Calif., USA, 2008), USENIX Association, pp. 1-14.

NPL 2: RHEA, S., COX, R., AND PESTEREV, A. Fast, inexpensive content-addressed storage in foundation. In Proceedings of the 2008 USENIX Annual Technical Conference (Berkeley, Calif., USA, 2008), USENIX Association, pp. 143-156.

NPL 3: DEBNATH, B., SENGUPTA, S., AND LI, J. Chunkstash: Speeding up inline storage deduplication using flash memory. In 2010 USENIX Annual Technical Conference (June 2010).

NPL 4: MEISTER, D., AND BRINKMANN, A. dedupv1: Improving Deduplication Throughput using Solid State Drives (SSD). In Proceedings of the 26th IEEE Symposium on Massive Storage Systems and Technologies (MSST) (May 2010).

NPL 5: QUINLAN, S., AND DORWARD, S. Venti: a new approach to archival storage. In First USENIX conference on File and Storage Technologies (Monterey, Calif., 2002), USENIX Association, pp. 89-101.

NPL 6: WEI, J., JIANG, H., ZHOU, K., AND FENG, D. Mad2: A scalable high-throughput exact deduplication approach for network backup services. In Proceedings of the 26th IEEE Symposium on Massive Storage Systems and Technologies (MSST) (May 2010).

NPL 7: LILLIBRIDGE, M., ESHGHI, K., BHAGWAT, D., DEOLALIKAR, V., TREZIS, G., AND CAMBLE, P. Sparse indexing: Large scale, inline deduplication using sampling and locality. In FAST (2009), pp. 111-123.

NPL 8: BHAGWAT, D., ESHGHI, K., LONG, D. D. E., AND LILLIBRIDGE, M. Extreme binning: Scalable, parallel deduplication for chunk-based file backup.

NPL 9: MING YANG, T., FENG, D., YING NIU, Z., AND PING WAN, Y. Scalable high performance de-duplication backup via hash join. Journal of Zhejiang University-Science C 11, 5 (2010), 315-327.

NPL 10: YANG, T., MANGY, H., FENGZ, D., AND NIU, Z. Debar: A scalable high-performance de-duplication storage system for backup and archiving. Tech. rep., University of Nebraska-Lincoln, 2009.

NPL 11: CLEMENTS, A., AHMAD, I., VILAYANNUR, M., AND LI, J. Decentralized deduplication in san cluster file systems. In Proceedings of the USENIX Annual Technical Conference (June 2009).

NPL 12: GOKHALE, S., AGRAWAL, N., NOONAN, S., AND UNGUREANU, C. KVZone and the Search for a Write-Optimized Key-Value Store. In USENIX 2nd Workshop on Hot Topics in Storage and File Systems (HotStorage '10) (Boston, Mass., June 2010).

NPL 13: YIN, S., PUCHERAL, P., AND MENG, X. Pbfilter: Indexing flash-resident data through partitioned summaries. Research Report RR-6548, INRIA, 2008.

NPL 14: YIN, S., PUCHERAL, P., AND MENG, X. Pbfilter: indexing flash-resident data through partitioned summaries. In CIKM (2008), pp. 1333-1334.

NPL 15: CHANG, F., DEAN, J., GHEMAWAT, S., HSIEH, W. C., WALLACH, D. A., BURROWS, M., CHANDRA, T., FIKES, A., AND GRUBER, R. E. Bigtable: A distributed storage system for structured data. In OSDI'06: 7th USENIX Symposium on Operating Systems Design and Implementation (Berkeley, Calif., USA, 2006), USENIX Association, pp. 205-218.

NPL 16: LEE, S.-W., AND MOON, B. Design of flash-based dbms: an inpage logging approach. In SIGMOD Conference (2007), pp. 55-66.

SUMMARY OF INVENTION

Technical Problem

These techniques may allow to achieve a reasonable bandwidth, but they have several drawbacks.

Both bloom-filter and prefetch require additional memory, its size is significant (memory consumption is discussed in details below).

Latency of lookup operation is not stable: some operations are handled using RAM, while others require disk access.

Disk reads with latency of several milliseconds may not be sufficient for some uses (e.g., primary storage).

If duplicates are not written in the same order as the original writes, the prefetch stops working effectively, and throughput drops by several orders of magnitude.

The last of the mentioned drawbacks tends to be the most severe. According to NPL 2, the order of writing duplicates has a tremendous effect on performance. Foundation system achieves 22 MB/s if duplicates are in the same order as original writes, but if duplicates are out-of-order the performance is only 6 KB/s. The question is how often we face out-of-order duplicates in real life backup usage. Each subsequent backup changes some fraction of data. Although differences between two subsequent backups are expected to be small, the difference between the first and the last backup may be substantial. With each next backup, ordering of duplicates will degrade and will eventually lead to out-of-order duplicates. We have not found any research in this area, but we expect it to happen after several dozens of backups. This problem increases not only with the number of backups of the same data, but also with the number of backup sets as duplicates can be found across multiple backup sets. A backup consisting of many small files may further intensify the problem because the files may be written in a different order.

As such, an exemplary object of the present invention is to provide a storage system capable of realizing stable latency while suppressing an increase in the memory size and also realizing efficient deduplication with respect to writes of different orders, which is the problem to be solved as described above.

Solution to Problem

According to an aspect of the present invention, a storage system includes a first auxiliary storage device for storing storage target data; a second auxiliary storage device having a higher data reading/writing speed than a data reading/writing speed of the first auxiliary storage device; a main storage device having a higher data reading/writing speed than the data reading/writing speeds of the first auxiliary storage device and the second auxiliary storage device; a data management unit that stores storage target data in the first auxiliary storage device, manages a storing position of the storage target data using feature data which is based on a data content of the storage target data, and refers to the feature data from index data which is based on a data content of the feature data; and a duplication determination unit that uses the feature data based on a data content of storage target data to be newly stored and the index data based on the data content of the feature data to determine whether or not storage target data, which is identical to the storage target data to be newly stored, has already been stored in the first auxiliary storage device. The data management unit stores and keeps, in the main storage device, the index data based on the feature data by referring to the feature data of the storage target data stored in the first auxiliary storage device, and if the index data stored and kept in the main storage device reaches a preset amount, stores and keeps, in the second auxiliary storage device, the index data stored and kept in the main storage device, and deletes the index data stored and kept in the second auxiliary storage device from the main storage device.

According to another aspect of the present invention, a computer-readable medium storing a program comprising instructions for causing an information processing device to realize, the information processing device including a first auxiliary storage device for storing storage target data, a second auxiliary storage device having a higher data reading/writing speed than a data reading/writing speed of the first auxiliary storage device, and a main storage device having a higher data reading/writing speed than the data reading/writing speeds of the first auxiliary storage device and the second auxiliary storage device: a data management unit that stores storage target data in the first auxiliary storage device, manages a storing position of the storage target data using feature data which is based on a data content of the storage target data, and refers to the feature data from index data which is based on a data content of the feature data; and a duplication determination unit that uses the feature data based on a data content of storage target data to be newly stored and the index data based on the data content of the feature data to determine whether or not storage target data, which is identical to the storage target data to be newly stored, has already been stored in the first auxiliary storage device. The data management unit stores and keeps, in the main storage device, the index data based on the feature data by referring to the feature data of the storage target data stored in the first auxiliary storage device, and if the index data stored and kept in the main storage device reaches a preset amount, stores and keeps, in the second auxiliary storage device, the index data stored and kept in the main storage device, and deletes the index data stored and kept in the second auxiliary storage device from the main storage device.

According to another aspect of the present invention, in a storage system including a first auxiliary storage device for storing storage target data, a second auxiliary storage device having a higher data reading/writing speed than a data reading/writing speed of the first auxiliary storage device, and a main storage device having a higher data reading/writing speed than the data reading/writing speeds of the first auxiliary storage device and the second auxiliary storage device, a data management method includes storing storage target data in the first auxiliary storage device, managing a storing position of the storage target data using feature data which is based on a data content of the storage target data, and managing the storage target data by referring to the feature data from index data which is based on a data content of the feature data; and using the feature data based on a data content of storage target data to be newly stored and the index data based on the data content of the feature data to determine whether or not storage target data, which is identical to the storage target data to be newly stored, has already been stored in the first auxiliary storage device. The managing the storage target data includes storing and keeping, in the main storage device, the index data based on the feature data by referring to the feature data of the storage target data stored in the first auxiliary storage device, and if the index data stored and kept in the main storage device reaches a preset amount, storing and keeping, in the second auxiliary storage device, the index data stored and kept in the main storage device, and deleting the index data stored and kept in the second auxiliary storage device from the main storage device.

Advantageous Effects of Invention

As the present invention is configured as described above, the present invention is able to provide a storage system capable of realizing stable latency while suppressing an increase in the memory size and also realizing efficient deduplication with respect to writes of different orders.

BRIEF DESCRIPTION OF DRAWINGS

FIG. 4 is a table showing write cache size, relative price, and SSD utilization by sweeps as a function of lambda in the first exemplary embodiment;

FIG. 6 is a table showing comparison of different write cache organizations in the first exemplary embodiment;

FIG. 10 is a table showing costs of different solutions according to the first exemplary embodiment;

FIG. 11 is a table showing the comparison results between the method of the first exemplary embodiment and a method according to NPL;

DESCRIPTION OF EMBODIMENTS

First Exemplary Embodiment

In the present invention, Solid State Deduplication Index (SSDI), a structure for looking up duplicates designed to be placed on flash-based SSD is presented. The solution in the present invention is free from drawbacks of the previous ones—it is effective even during out-of-order deduplication, has stable, low latency of lookup operations and does not consume much RAM. Moreover, unlike recent work proposing another SSD-based structure for deduplication lookup, in the design of the present invention, we also take into account limited erasure and write endurance of SSDs and quantify RAM required by the solution.

This description is organized as follows. First, efficiency of read/write operations on flash-based SSDs will be discussed. Then, closed hashing schema will be described, and problems arising from placing it on SSD will be shown. Then, SSDI, a dictionary structure which fulfills performance requirements will be presented. Then, performance of the proposed solution will be evaluated, and it is compared with alternative approaches. Then, related work will be presented, and finally conclusions will be provided.

(SSD Characteristics)

To make placing of a duplicate identification structure on SSD possible, we need to find an SSD device that can serve a sufficient number of small random reads per second. Other features of SSD device are not so important for the present invention. For example, the present invention does not need power failure resistance, as it is expected that the structure can be rebuild on a base of information kept on data disks. In addition, the device should be fairly cheap to reduce the price of hardware used by the system of the present invention.

The results of performance tests run on 80 GB Intel X25-M SATA SSD and on 1 TB Hitachi Ultra-start 7200 RPM SATA HDD will be presented. Before the tests, the SSD device has been filled with random data (the state of SSD sometimes has impact on its performance, e.g., bandwidth of writes on out-of-the-box device may be much higher than after filling the device). The tests were run on Linux using direct-io and native command queuing; the write cache on the SSD device was turned off.

Figure 1:
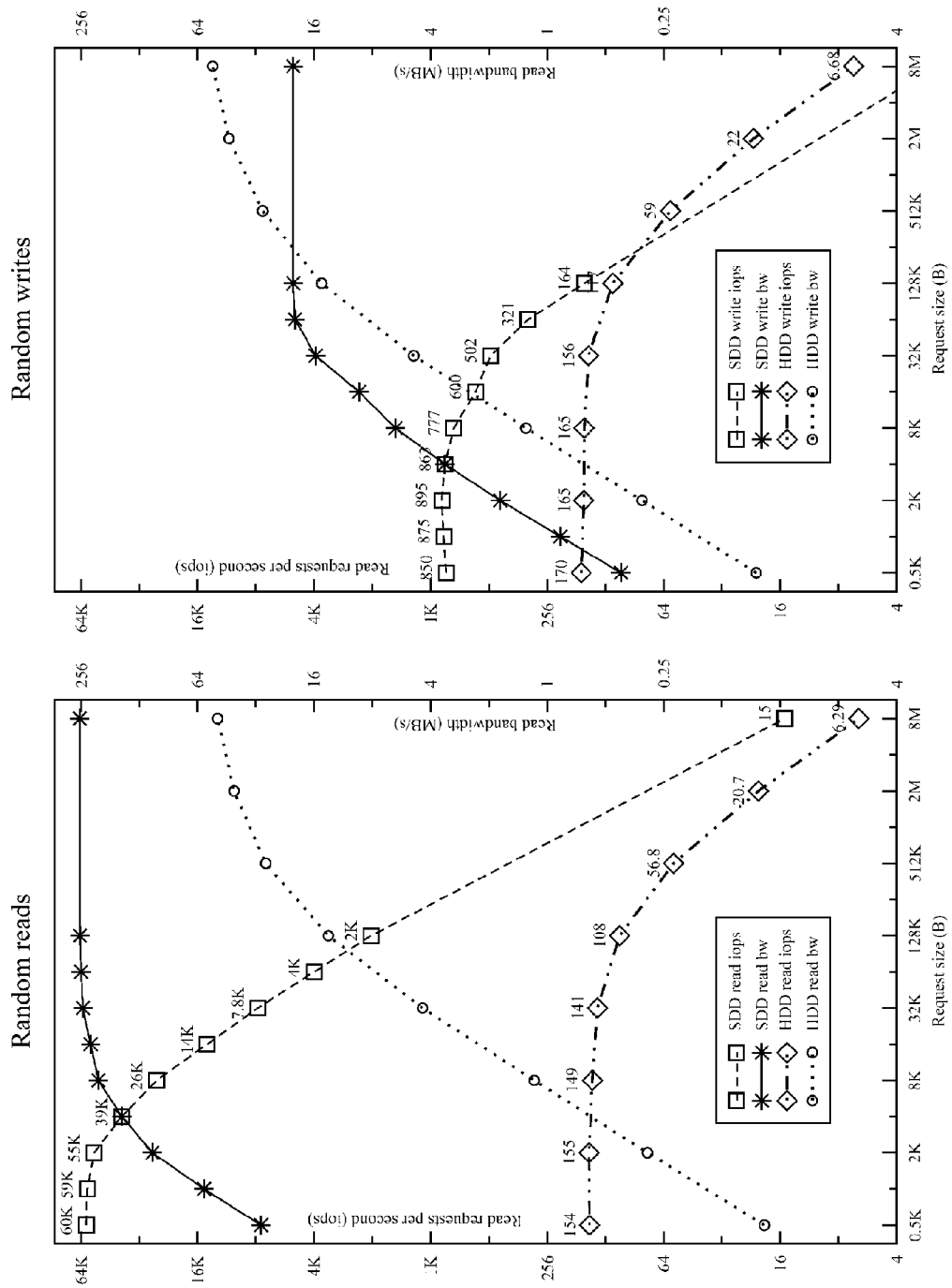
FIG. 1 shows charts indicating the results of performance tests of the SSD in a first exemplary embodiment.

The results are presented in FIG. 1. Characteristics of random reads and random writes are similar for HDD, while on SSD random writes are much slower than random reads. The SSD reaches maximal bandwidth faster (i.e., for smaller blocks) than the disk. Small SSD reads achieve good bandwidth at a very high iops rate. On the other hand, small SSD writes are particularly inefficient.

SSD write bandwidth grows with request size up to the erase block size (64 KB). Random writes achieve the best bandwidth if they have size equal or greater than the size of an erase block. It happens because to write a small request the Flash Transaction Layer (FTL) usually needs to erase and write again the whole erase block (small sequential writes may be buffered by a write cache of the device). FTL in cheaper devices typically works on the erase block level, otherwise the FTL would consume too much of the SSD's internal RAM for keeping translations.

In general, the number of small random reads handled by an SSD is high; however, to achieve reasonable write bandwidth, SSD writes need to be issued in larger blocks.

(Closed Hashing)

A hash table is an obvious choice for a deduplication dictionary. Data chunks are identified by their hashes, therefore, the hash of a data chunk will be the key in the hash table. In each hash table's entry, metadata-record for one chunk is kept. Since for each chunk we need to keep at least its hash (e.g., SHA-1 has 20 bytes, SHA-256 has 32 bytes) and its localization on disks, each metadata records will consume few dozen bytes.

Figure 2:
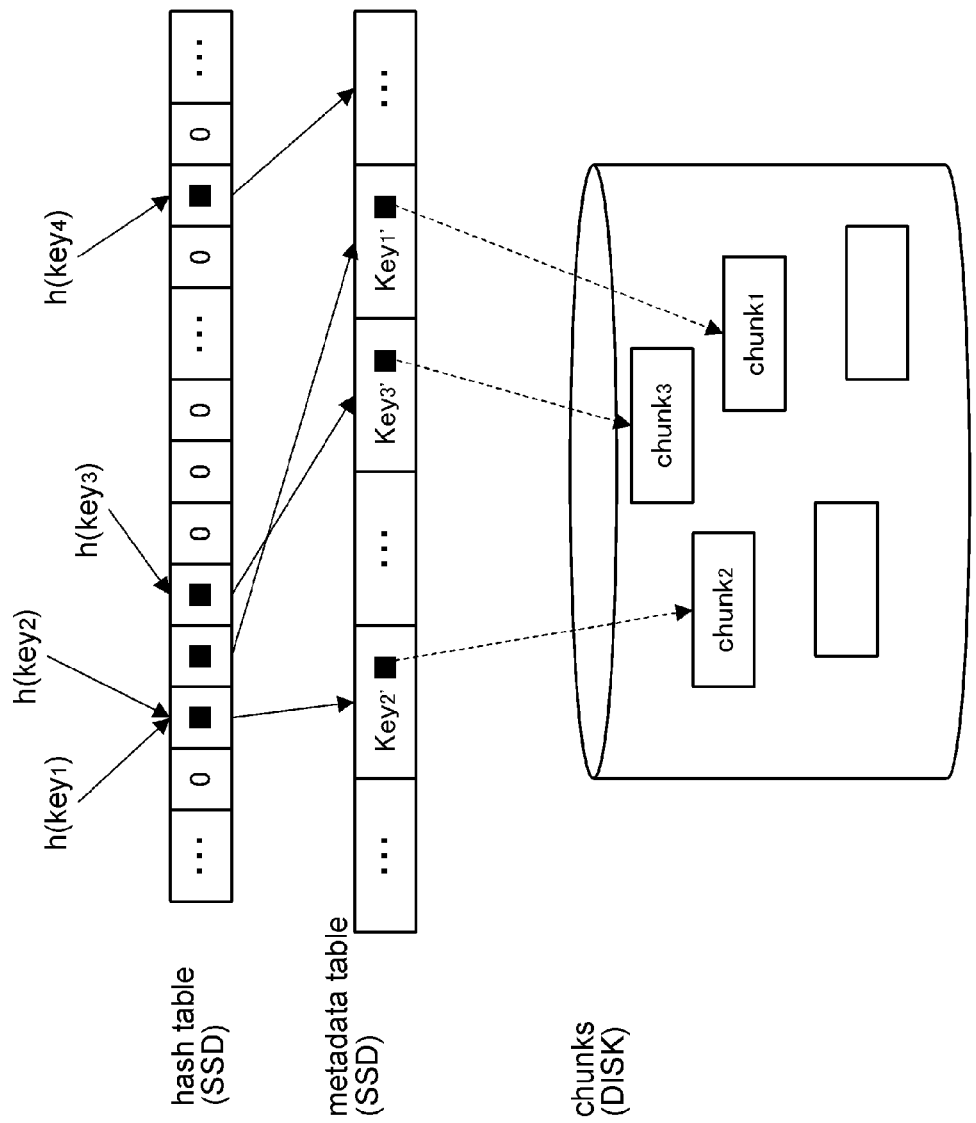
FIG. 2 shows an aspect of retrieving chunks in the first exemplary embodiment.

We start deduction of the structure of the present invention from closed hashing schema, and later show why it cannot be directly used for flash-based dictionary of duplicates. In closed hashing, there is a hash function, which transforms the key into the index in a table where entries are kept. To operate efficiently, a hash table needs a certain fraction of entries to be free. As the metadata-record used in the present invention is quite big, storing records by value directly in the table will be inefficient. To avoid it, the present invention uses two tables: a hash table and a metadata table (see FIG. 2). The hash function on a key determines the index in the hash table, collisions are solved using linear probing. In the hash table, only indices to the metadata table are kept. During look-up, we check entries from the hash table by reading keys from the metadata table and comparing them with the wanted key. We check entries one-by-one, beginning from the entry with the index given by the hash function, until we find a matching metadata-record or until there is an empty entry in the hash table.

Let's examine the efficiency of placing the above structure on a flash-based solid state drive. According to the observations described above, small random reads are efficient. The only concern is that during look-up both hash and metadata tables need to be checked. Reading from the hash table is efficient as candidates are grouped together and a single read request is sufficient. However, metadata-records of candidates cannot be read in one request as they are randomly placed through the entire metadata table. For each candidate, we have to issue an additional read request to get its key from the metadata table. The number of reads required to check if a given key is present will increase with growing load factor of hash table. For example, two reads from the metadata table will be needed during look-up of $chunk_1$ for the case illustrated by FIG. 2.

Inserting new entries causes another much more severe problem. Distribution of hashes is uniform, therefore, there is no space locality during inserts. Number of iops for random writes does not make it possible to update SSD structures on every insert. Small random writes are costly, their bandwidth is poor and they may lead to faster wear-out as the amount of data erased is much larger than the data actually modified and written. The problem mainly relates to the hash table as the metadata table can be updated with bulk writes. In the present invention, it is needed to organize the structure in such a way that the size of a write request is larger, preferably equal to the size of the erase block.

(Solid State Deduplication Index)

Here, Solid State Deduplication Index, a flash-based structure which fulfills deduplication performance requirements, will be described. The structure overcomes problems mentioned at the end of the previous paragraph.

The present invention introduces extra filtering to prevent unnecessary reads from the metadata table. Each hash table entry will keep not only the index to the metadata table, but also a filter which is a small part of the key from this metadata. Read from the metadata table will be preformed only if the filter bits match corresponding bits from a key that is being looked-up. For the situation illustrated by FIG. 3: during lookup of $chunk_1$ metadata-record for $key_2$ will not be read unless $f(key_1)=f(key_2)$. Note that such filtering effectively reduces the probability of reading a metadata-record with a wrong key. Even if we spare only ten bits in each entry for a filter, the probability that a metadata-record with a wrong key is read is 0.1/1024. To achieve the same reduction ratio by enlarging the hash table, it would have to be many times bigger.

Figure 3:
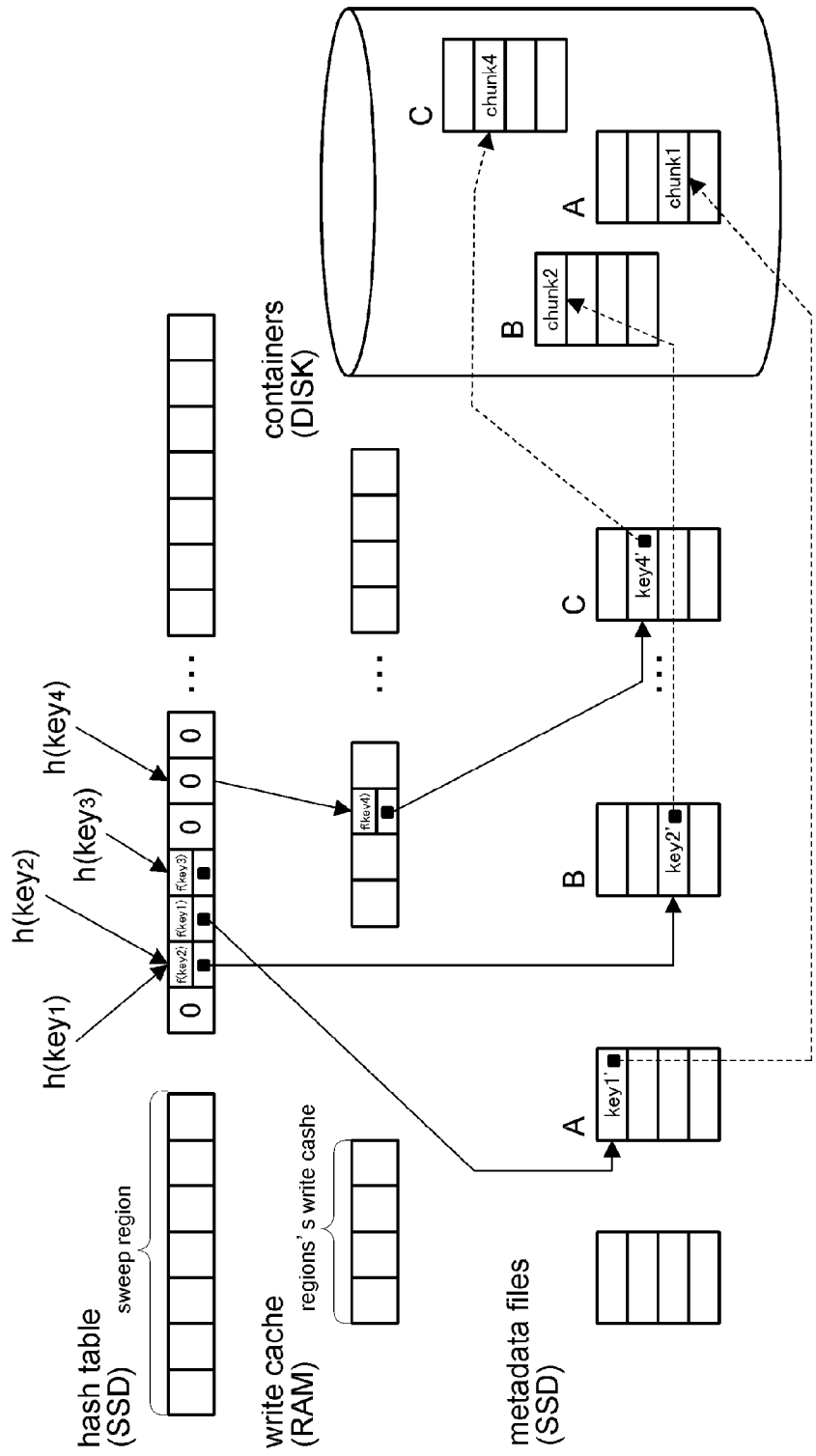
FIG. 3 shows a solid state deduplication index in the first exemplary embodiment.

Flash architecture makes hash table in-place updates impossible. Only writes of large blocks result in a satisfactory bandwidth. Therefore, updates of the hash table need to be done in a batch mode. To achieve this, the present invention introduces a write cache kept in RAM. During update, a new key is only inserted in such cache. The write cache is organized as a hash map to allow efficient keys lookup. While searching for a key, the write cache needs to be checked in addition to checking the hash table. In FIG. 3, the index of the metadata-record for $key_4$ will be obtained from the write cache. Note that, as the entire write cache is kept in memory, the additional check has negligible impact on performance. When the cache is fully loaded, we perform sweep operation—the hash table is rewritten with the application of all cached modifications clearing the write cache in the process. To make sweep implementation simpler, the hash table is divided into disjoint regions of a fixed size in the present invention. The size should be small enough to make it possible to read the whole region into memory. The write cache is divided accordingly, so each region has its own independent cache in RAM that can be swept independently.

It is also needed to modify organization of the metadata table to prevent in-place updates. To do so, first data organization in disk based deduplication storage systems will be described. All studied systems introduce an abstraction of a container for data chunks. Proposed names for such container vary in different systems: they are called arenas, megablocks, containers, and synchrun component containers (SCCs). Although detailed organization of data in containers is different in each system, containers are intended to be kept in separate files on disks. Operations on containers are performed in a way to ensure sequential read/write when accessing container files, which allows for efficient usage of disks.

Only a few containers are opened for appends, new writes are directed to them, therefore, new writes to containers are sequential (similar to a log-structured file system).

If chunks are read in the same order they were originally written, then reads from containers are also sequential.

Operations that modify or synchronize chunks kept by the system update a whole container at once (e.g.: marking chunks as dead, reclaiming space occupied by dead chunks).

The design of the present invention follows the container approach. Instead of one global metadata table, the present invention will keep a separate metadata file for each container. For example, there are three containers (A, B, C) in FIG. 3, each of them has one corresponding metadata file. The metadata files consist of the same records as the metadata table (the chunk's key and localization of the chunk in the container). Each metadata-record is updated together with the modification of its container.

(Limitations of RAM-Only Write Cache)

Write endurance of modern MLC NAND flashes usually allows for 5 k-10 k of program-erase cycles. With a system lifetime measured in many years, ensuring that writes performed for hash table sweeps will not cause wear-out of the flash device requires a substantial write cache in RAM.

The following equations present dependencies among the size of the write cache, the time after which SSDs will become unusable and read/write bandwidth of SSDs consumed by sweeps.

[Math. 1]

$$SweepPeriod = \frac{WriteCacheCapacity}{ChunkWritesPerHour} \quad (1)$$

$$SSDLifeTime = \lambda \cdot Endurance \cdot SweepPeriod \quad (2)$$

$$SweepBandwidth = \frac{HashTableSize}{SweepPeriod} \quad (3)$$

$$Cost = \frac{\lambda \cdot HashTableSize}{SSDPricePerGB} + \frac{WriteCacheCapacity}{RAMPricePerGB} \quad (4)$$

Endurance is the write endurance in program-erase cycles of the SSD's flash cells. SweepPeriod is the time interval between hash table sweeps. It is the time required for new chunk writes to fill the whole write cache. To increase the life time of SSDs, we can extend space on SSDs for keeping the hash table; lambda is the factor of such extension. Sweep-Bandwidth is the bandwidth of reads and writes that will be utilized by hash table sweeps. The SSD performance will be degraded by these operations (number of queries per second will be affected).

According to equations (2) and (3), a longer sweep period gives better life time and results in less performance degradation. However, equation (1) states that the longer period requires a larger write cache. Since the entire write cache is kept in RAM, the equations define a hardware tradeoff—we may save RAM for write cache with the cost of bigger/faster/more SSD devices.

Let's go back to the requirements for a storage system defined above. The system is equipped with 12 1 TB disks, the target bandwidth of the whole system for non-duplicate writes is about 350 MB/s (about 160 million chunk-writes per-hour). The size of hash table is about 16 GB (assuming capacity of 1.5 billion entries; 75% max load factor; and entry size of 8 bytes: 54 bits for metadata file's identifier and chunk's offset inside the metadata file, and 10 more bits for per-entry filter). In FIG. 4, systems with 6 years life time using 10 k flashes are compared. To calculate relative price, it was assumed that per-GB cost for RAM is about 11 times higher than for SSD (see (1) below).

(1) Prices of Kingston 4 GB ECC Fully Buffered RAM and Intel X25-M SSD 80 GB drive were compared.

FIG. 4 shows that assuming a 6 year system lifetime, we need between close to 1 GB and 4 GB of RAM for the write cache. In the first row, a system that keeps entire hash table in RAM is presented. Keeping hash table on SSD significantly reduces the hardware cost. Moreover, increasing SSD space for keeping hash table (lambda) reduces RAM needed for write cache, but not necessarily reduces the total cost of used hardware. (If we have spare SSD space, we can increase lambda and utilize it, but there is no economical difference in buying extra SSD to increase lambda instead of buying extra RAM). Below, an improved organization of the write cache which reduces both memory consumption and overall hardware cost will be proposed. Actual cost of different solutions is compared below.

(Hierarchical Write Cache)

We can reduce the size of the memory needed for the write cache by placing a part of it on SSD. For the in-RAM write cache, it is possible to allocate a buffer of equal size on SSD and use this buffer to dump the in-RAM cache content when this cache becomes full. Such buffer is also organized as a hash table. A sweep will be performed only after both in-RAM cache and its buffer are full. If we want to keep the number of main hash table sweeps unchanged, adding such buffer allows us to cut the in-RAM cache size in half. Unfortunately, now it is necessary to check the buffer on SSD on each lookup operation.

To alleviate this problem, we can attach a bloom filter to this SSD buffer, greatly reducing the expected number of additional SSD reads. To quantify the solution, it is assumed to use bloom filters with 1% false positive ratio. This reduces 100 times the mean number of additional reads. The size of such bloom filter (in bits) needs to be 10 times larger than the number of entries kept in it. Since the size of an entry in the hash table is 8 bytes and our hash tables has maximal load factor of 75%, the size of such bloom filter will be about 8 times smaller than the size of its write cache.

Instead of one such SSD buffer, we can have many of them, each with an attached bloom filter. Additional buffers reduce in-RAM cache size but increase RAM consumption with more bloom filters. By adding more buffers, the total RAM consumption can be reduced at most 8 times, because with each reduction of in-RAM write cache, we need to give back ⅛ of this reduction with bloom filter RAM consumption.

To obtain higher in-RAM size reduction, we propose to introduce the 3rd level of caching, beyond the in-RAM write cache (the 1st level), and read-only buffers described above which constitute the 2nd level caches. The 3rd level cache is also organized as a hash table.

The three level cache organization looks as follows (see FIG. 5):
 1. one write cache kept in RAM, capable of holding up to 1 entries;
 2. up to $n_2$ write caches on SSD, each holding 1 entries, each with in-memory bloom filter;
 3. up to $n_3$ write caches on SSD, each holding $1(n_2+1)$ entries, without bloom filters.

During insert, entries are placed in level-1 write cache kept in RAM. If this cache is exhausted, it is written to SSD as a level-2 write cache, and its summary is preserved in a bloom filter in RAM. There is a limit for the number of level-2 write caches ($n_2$, in the figure the limit is 4). When dumping another RAM cache exceeds this limit, the level-1 cache and all level-2 caches are merged together and written to SSD as a level-3 cache. During the merge, all entries present in level-1 and level-2 caches are written to a new level-3 write cache; level-1 and level-2 caches are cleared. Therefore, each level-3 write cache is ($n_2+1$) times bigger than level-1/level-2 caches. If writing of merged level-1 and level-2 caches breaks the limit for the number of level-3 caches ($n_3$, in the figure the limit for the number of level-3 caches is 2), a sweep is performed—all caches are merged together with a sweep region and a new sweep region is written.

Note that in-memory bloom filters for level-2 caches are kept, but not for level-3 caches. The size of this bloom filter is proportional to the size of its cache, and it almost always prevents 1 unnecessary SSD read during lookup.

That makes bloom filters for level-2 caches more efficient as level-2 caches are few times smaller than level-3 caches.

Figure 5:
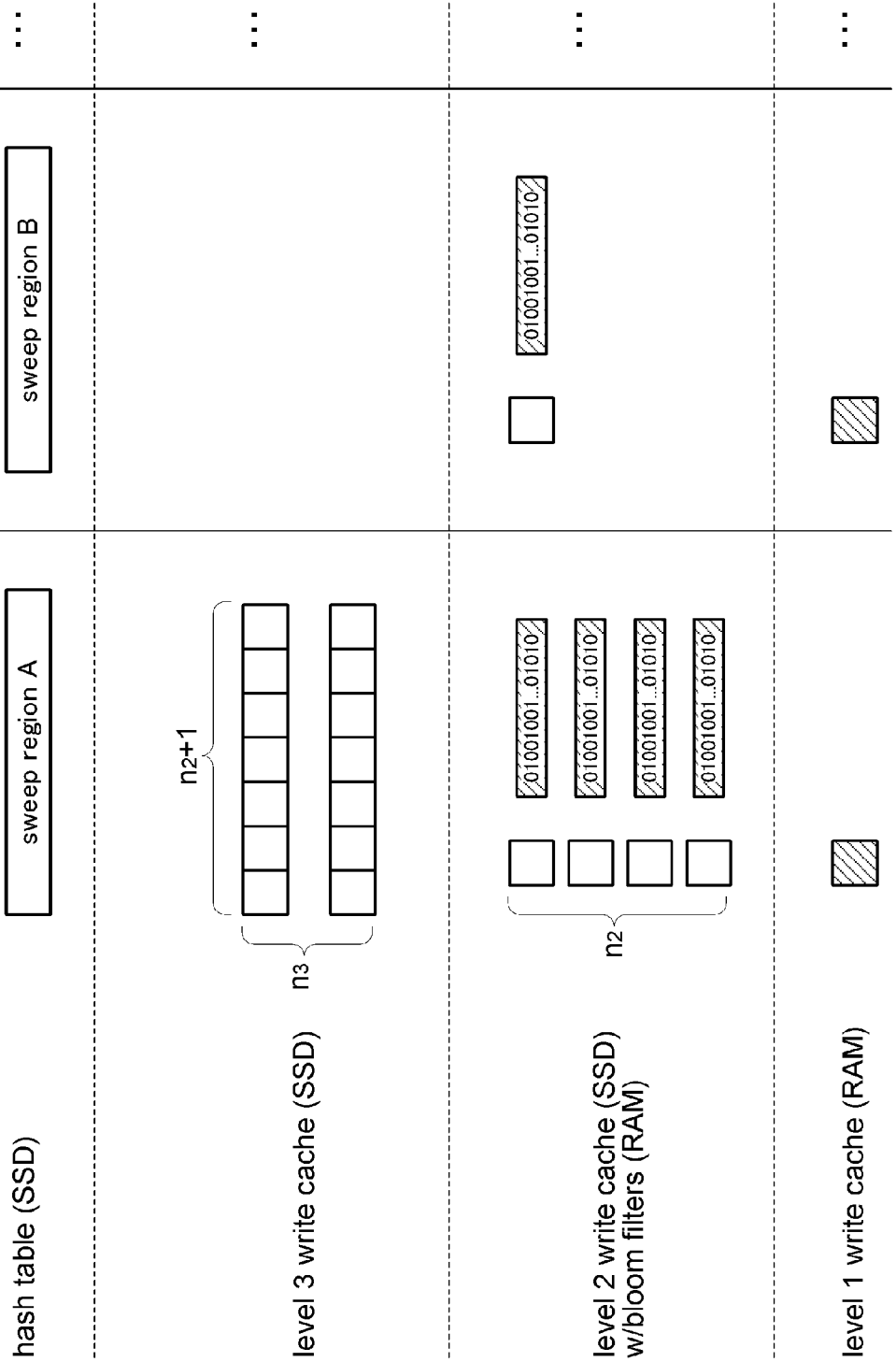
FIG. 5 shows a 3-level write cache organization of the first exemplary embodiment.

During lookup, all write caches need to be checked. In FIG. 5, for sweep of region A, we will need 2 additional reads from level-3 write caches and up to 4 additional reads from level-2 write caches, depending on bloom filter false positive ratio. For the sweep of region B, which has no level-3 write caches and only one level 2 write cache, no more than one additional read will be needed.

(Evaluation of Multi-Level Write Cache Organizations)

Different write cache organizations are compared in FIG. 6. All organizations compared are intended to keep k entries. We assume that bloom filters which give 1% false positive ratio are used. The factor alpha is the space required for keeping one write cache metadata-record (or hash table metadata-record) including overhead for write cache load factor.

$$\alpha = \frac{HashTableEntrySize}{WriteCacheMaxLoadFactor} \qquad [\text{Math. 2}]$$

We assume that maximal load factors for write caches of all levels are the same and equal to 75%. The entry size is set to 8 bytes. The factor gamma is a proportion of the number of entries kept in write caches of all levels to the total number of entries kept in the whole Solid State Deduplication Index.

$$\gamma = \frac{NumberOfEntriesInWriteCaches}{NumberOfEntriesInSSDI} \qquad [\text{Math. 3}]$$

In the present invention, it is expected that gamma is about 0.2 (5 times more entries kept in the hash table than in the write cache).

If level-3 write caches only (the second column in FIG. 6) is used, linear RAM reduction is gained at the cost of linear number of additional reads; if only level-2 write caches (the third column) is used, we reduce RAM for write cache but also need additional RAM for bloom filters what limits total reduction. Combination of level-2 and level-3 write caches is the most efficient—RAM reduction gained by level-2 and level-3 write caches multiplies (the fourth column). In the right-most column, we can see that the 3 level cache organization with $n_2=4$ and $n_3=2$ effectively reduces memory consumption 10 times, with the average cost of about one additional read from SSD during lookup.

(Removing Entries)

Removing data from a deduplication storage system is a considerable issue. Because of deduplication, it is hard to judge if a chunk that a user wants to delete should be actually removed from the system. Therefore, systems do not immediately remove such chunks; they rather organize data chunks in a structure and implement deletion as an off-line process, similar to Mark-and-Sweep garbage collection. The deletion process affects the whole system and computes the new system state; in effect, new versions of containers are computed. The design of removing entries from Solid State Deduplication Index nicely fits this approach.

The deletion process operates on the container level. During marking phase, chunks to reclaim are marked as to be removed in metadata files, but the chunks are not instantly removed from containers. Space reclamation is a background process, chunks are reclaimed from each container independently. Reclamation rewrites a container leaving only chunks that are not marked as to be removed. Each container has a unique identifier, the identifiers of the container before and after the reclamation are different. During the reclamation, we mark the old identifier as removed and thereby logically remove all its translations from the hash table (note that the core hash table state is not modified during such remove). Chunks present in the new version are inserted into the hash table (with the new identifier) using regular insert operation. The hash table is actually purified from the old localizations during hash table sweep; the old identifier can be reused after the sweep is finished.

It may happen that an entry which is present in the hash table is actually removed from the metadata files. The state in the metadata files is superior. If, during lookup, such already removed entry is found, we go back to the hash table and continue search for the given key, similarly as if key verification after read from the metadata table failed. It may result in performance degradation (additional reads from SSD) during lookup, when an already removed block is queried. Such degradation should not be severe and the hash table state will finally be rectified by the sweep.

(Performance Evaluation)

We evaluate different solutions as if they were intended for systems that can be installed in 2-rack-unit-box. Such systems, like Data Domain DD630 or NEC HYDRAstor HS3-210, are usually equipped with 12 1 TB disks for data storage.

Four solutions have been compared:

Data Domain (DD) system (NPL 1): with 0.3% false positive ratio bloom filter (2.3 GB RAM) to speedup negative answers, and stream prefetch (1 GB RAM) to speed-up positive answers. The solution has been described closer above.

Microsoft ChunkStash (CS) (NPL 3): with cuckoo hashtable (10 GB RAM) and stream prefetch (1 GB RAM). CS, like SSDI divides the dictionary structure into a hash table and files with metadata of containers (equivalent to metadata files in our solution). The hash table is kept in RAM, while the metadata files are kept on SSD. To reduce the hash table size, cuckoo hashing is used (which allows a higher load factor than regular hashing) and the table entry contains an identifier of metadata file only (exact offset in the file is not known). Hash table for 1.5 billion chunks consumes about 10 GB of memory (entry size is 6 bytes).

Solid State Deduplication Index (SSDI): with entire write cache in memory (4 GB RAM, no write cache on SSD), without stream prefetch.

Solid State Deduplication Index (SSDI-3lvl): with 3-level write cache with $n_2=4$ and $n_3=2$ (0.4 GB RAM, about 4 GB SSD), without stream prefetch.

To compare the solutions, a simulator which computes disk and SSD usage is implemented. We estimate performance of different solutions on the basis of the simulator's results and SSD/HDD characteristics given above (assuming a server equipped with 12× Hitachi Ultrastart 1 TB 7200 RPM disks and 2× Intel X25-5 SSDs, capable to store up to 1.5 billion chunks). Chunks are identified by SHA-2562 (see (2) below), metadata-record size is 50 bytes. Following the design of Data Domain servers, it is assumed that storage disks (for storing both container files and metadata files) are organized in RAID-6. Such organization can tolerate loss of any two disks. In simulations of DD and SSDI solutions, metadata files have the size of 1 MB, for CS the size is 64 KB (see (3) below). Container files were flushed in 5 MB chunks (see (4) below).

(2) Any cryptographic hash function can by used to identify chunks. Nevertheless, it is decided to focus on SHA-256 rather than SHA-1 in the present invention as, due to weaknesses found in SHA-1, attacks against it become continuously more effective. Still, the solution will work with SHA-1 as well.

(3) CS does not keep metadata file offsets, therefore uses smaller metadata files than DD/SSDI to reduce read request size.

(4) This is a rather optimistic assumption: large flush chunk sizes cause higher latency, which may be troublesome for backup applications.

Performance in Border Conditions

In the first experiment, for each solution two tests were run:
fresh writes (0% duplicates),
duplicate writes (100% duplicates, random order of duplicates).

In each test, the total amount of 1 TB data in 8 KB blocks was written.

Figure 7:
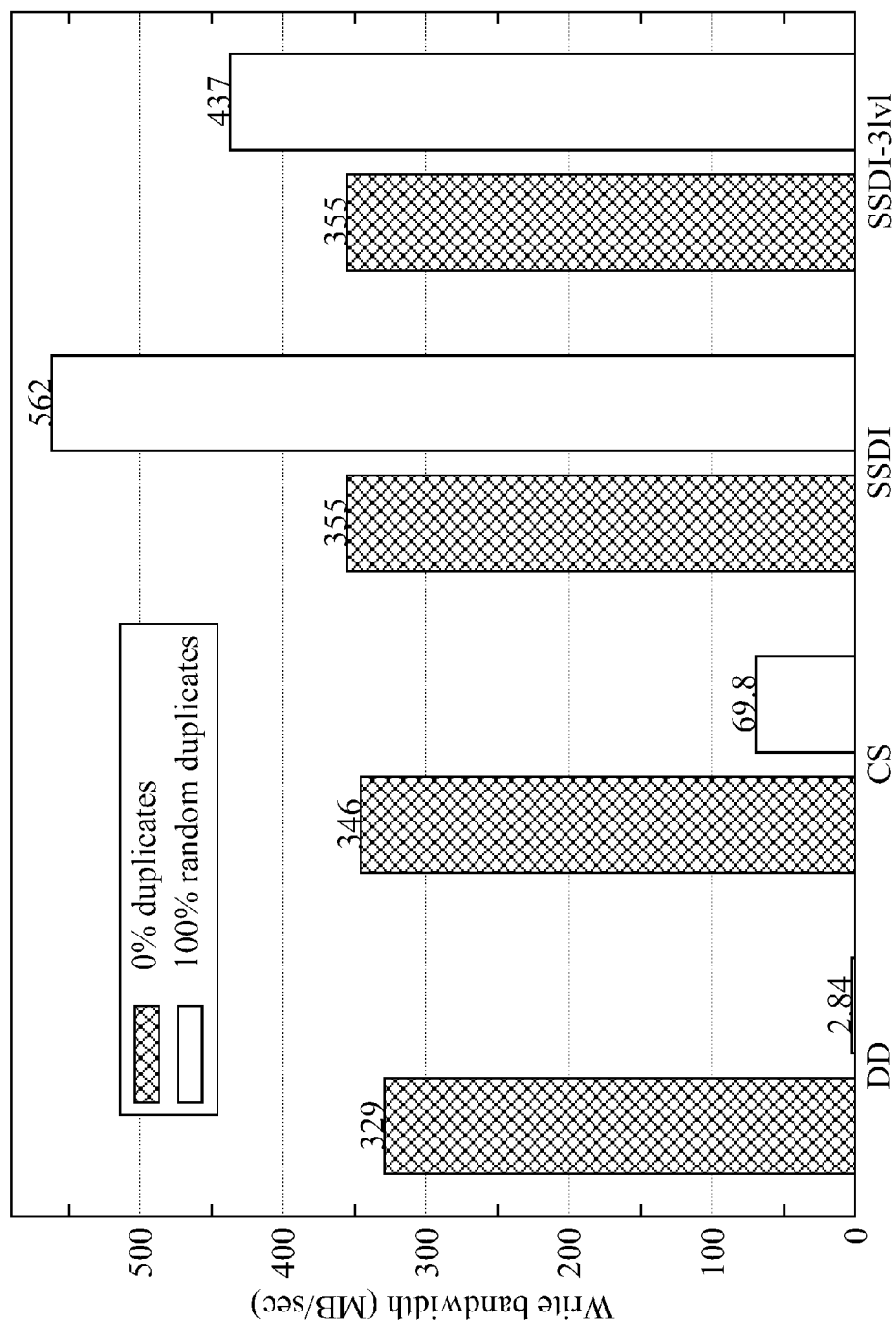
FIG. 7 is a chart showing the write performance according to the tests performed in the first exemplary embodiment.
Figure 8:
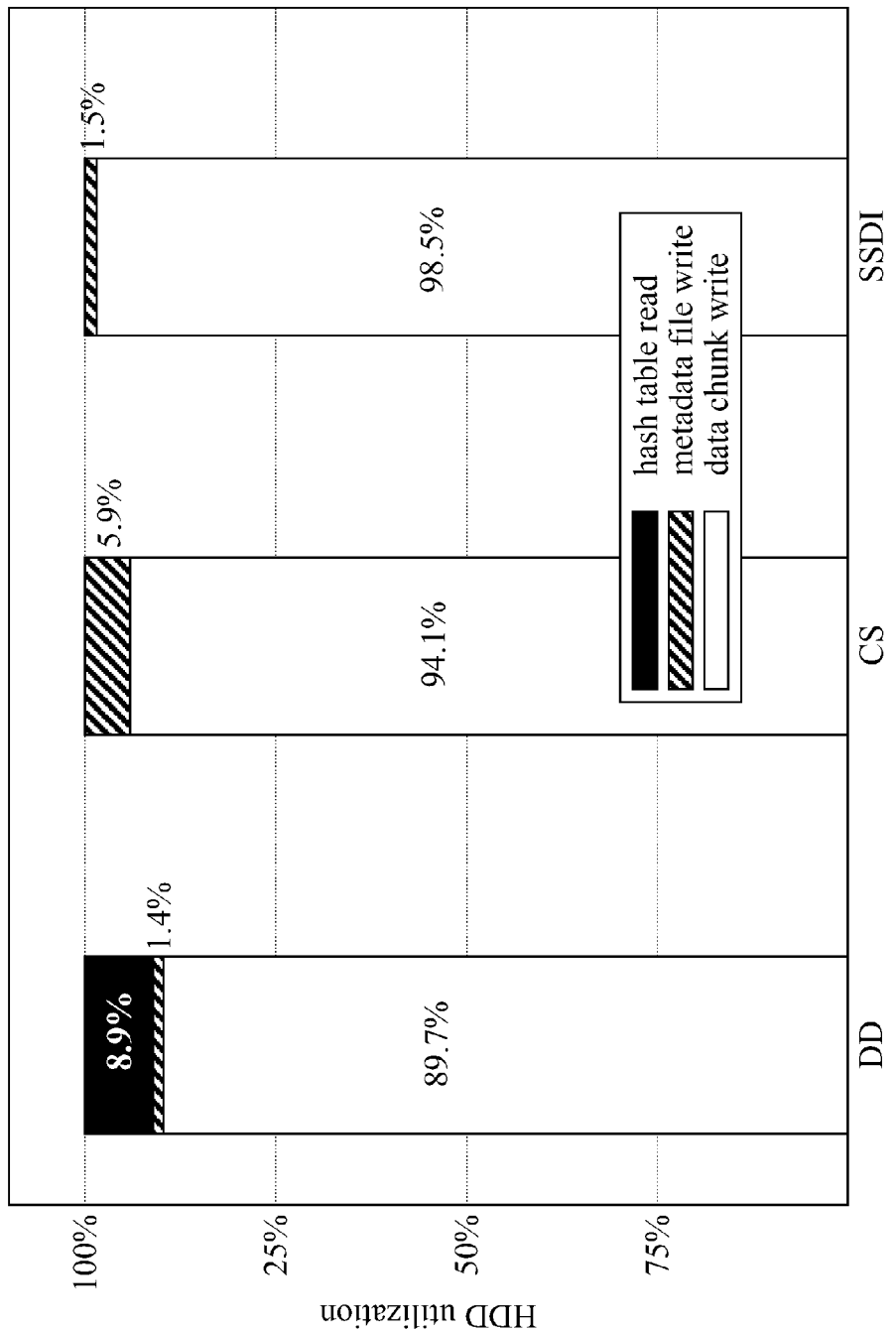
FIG. 8 is a chart showing the disk utilizations during writes according to the tests performed in the first exemplary embodiment.

The results are shown in FIG. 7. For fresh writes, SSDI solutions were slightly better than DD and CS. This happens because in SSDI solutions disks are almost fully utilized by writing data chunks to container files (see FIG. 8). DD utilizes disks also for reading from a disk-resident hash table to handle bloom filter false positives, while CS enforces smaller size of containers metadata files, which increases disks utilization for writing them. Note that write performance for DD measured by the experiments nearly exactly matches the write performance of DD630 system given in (1) above (1.1 TB/hr, i.e., 320 MB/s).

For random duplicates (FIG. 7), SSDI solutions are unrivaled. Note that performance degradation caused by the 3-level write cache compared to SSDI is not so significant (about 20%), and random duplicates are still handled by SSDI-3lvl faster than fresh writes. CS prefetches metadata files into RAM and, like DD, relies on the fact that the order of duplicates during subsequent runs is preserved. In the case of random duplicates, a read of the whole metadata file for each hit is needed. In effect, the bandwidth of random deduplication is better than in disk based solutions but still inferior.

Performance in Usual Conditions

The second experiment was performed to judge feasibility of equipping SSDI with in-memory stream prefetch. We estimated the performance impact of the stream prefetch size using data from real life backups. We restricted the number of hashes kept in prefetch to range from 0.05% to 4% of all hashes stored in the system (assuming 32 byte hash, it corresponds to RAM consumption from 375 MB to 3 GB). The experiment evaluates business usefulness of solutions, therefore, we decided to exclude CS and SSDI as uncompetitive because they consume too much memory; we restrain our considerations to DD and SSDI-3lvl (CS needs about 10 GB of RAM, SSDI about 4 GB; this is a way more than SSDI-3lvl, which needs only 400 MB, and DD, which needs 2.3 GB, but may be substantially reduced if a smaller bloom filter is used).

The prefetch was implemented as a Least Recently Used (LRU) read cache. The size of a metadata file was 1 MB, the same as in the first experiment; however, prefetch size was 128 KB (each metadata file contained 8 such prefetches).

We run tests on three real life datasets. Each dataset consists of a sequence of backups.

Wikipedia: 5 monthly backups of Wikipedia, each backup has about 25 GB; 40.9% duplicates in the last backup.

Mailboxes: 32 daily backups of about 50 mailboxes of employees working in software development company, each backup has about 34 GB; 94.0% duplicates in the last backup.

Homedirs: 14 weakly backups of home directories of about 100 employees working in IT research laboratory; each backup has about 78 GB; 98.6% duplicates in the last backup.

Backup streams were divided into chunks using a technique called Content Defined Chunking (Rabin's Fingerprint is computed on a small moving window of the input stream, chunk boundary is made when the fingerprint reaches a distinctive value). Average chunks size was 8 KB.

Figure 9:
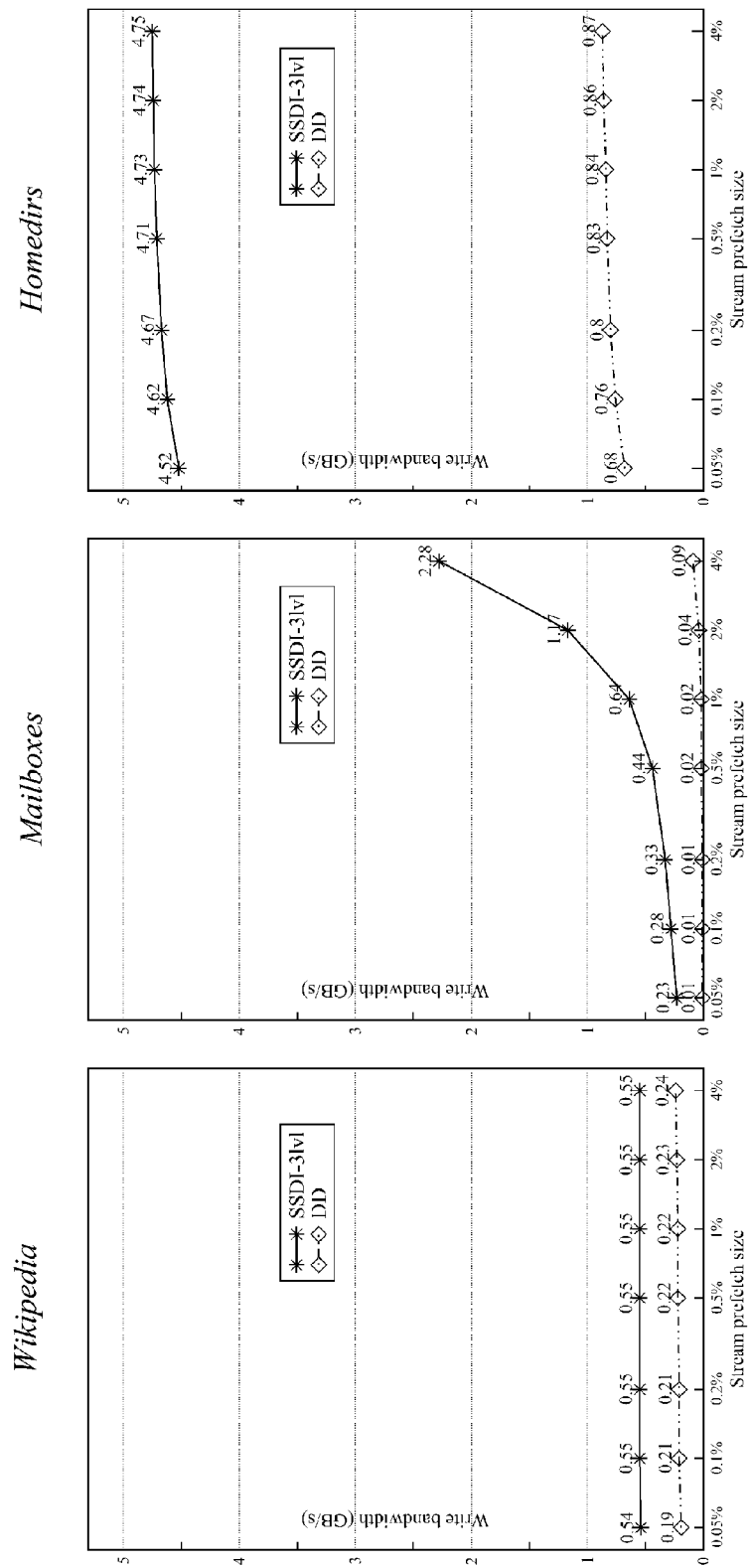
FIG. 9 shows charts indicating effectiveness of LRU stream prefetch according to the tests performed in the first exemplary embodiment.

Write performance for the last backup in the sequence will be presented. The results are shown in FIG. 9.

Wikipedia in majority contains new writes (40.9% of the duplicates), which affects the write bandwidth. Regardless of prefetch size, SSDI-3lvl is nearly three times faster than DD. The order of duplicates is preserved but good deal of prefetched chunks has changed and is unused. The performance is limited by disks bandwidth. SSDI-3lvl uses the bandwidth for writing new data, while DD uses it for both writing new data and reading metadata files. Homedirs contains mostly duplicates (98.6%), and here SSDI-3lvl is over five times faster than DD. For Homedirs the performance is mainly limited by the bandwidth of reading metadata files from disks and SSDs. In both Wikipedia and Homedirs, relative increase of performance due to the increase of LRU prefetch size is not significant.

The most interesting results were observed for Mailboxes. The backup of mailboxes contained 94% of duplicates. Nevertheless, emails are kept in small files and the order of files in an archive partially differs during subsequent backups. This deteriorates locality of writes. Consequently, DD solution achieved very poor performance. The performance of SSD-3lvl was about 20-30 times better, however, the size of stream prefetch had a significant impact on it. The stream-prefetch was counter-effective when its size was lower than 0.5%. As the first experiment showed, SSDI-3lvl without prefetch should achieve more than 400 MB/s for the given duplicate ratio. The performance for small prefetch was lower because the size of a single read request from SSD was 128 KB instead of 512 B (see (5) below).

(5) This issue most probably may be overcome by using a prefetch algorithm more elaborate than LRU, yet this is outside the scope of the present invention.

(Cost Evaluation)

To compare costs of different solutions, it is assumed that RAM price is 31.25$ per-GB (based on the price of Kingston 4 GB ECC Fully Buffered RAM—125$) and SSD price is 2.75$ per-GB (the price of Intel X25-M SSD 80 GB drive is 220$). The results are presented in FIG. 10, in which solutions with no stream prefetch are compared. SSDI-3lvl is nearly two times cheaper than CS but it is also nearly four times more expensive than DD. It may look discouraging but we need to remember that SSDI-3lvl has much better performance than DD and that SSDs are getting cheaper much faster than RAM. We expect that the overall costs of SSDI-3lvl and CS will match in few years.

(Related Work)

The idea of using flash memory to speed up inline deduplication appears in ChunkStash (CS) (NPL 3). CS has already been described above: it consumes much more memory than the solution of the present invention and achieves much worse performance for random duplicates. The inventors indicate the possibility of reducing the hash table size by keeping only a fraction of the chunks in it, but this will cause deduplication to no longer be reliable.

System dedupv1 (DDv1), described in NPL 4, also handles inline deduplication using an SSD-based structure. DDv1 keeps metadata of all chunks directly in a flash-based hash table (unlike the solution of the present invention, the metadata files are not kept separately). There are no in-place updates of the hash table, instead, modifications are cached in memory and then applied by rewriting the whole table (similar to sweep in the solution of the present invention, but the table is not divided into sweep regions). At first glance, such organization is capable of handling random reduplicates as effectively as SSDI. However, NPL 4 does not address problems arising from limited erasure/write endurance of SSDs, does not study degradation of SSD performance caused by sweeps, and does not discuss the amount of RAM needed to keep the write cache.

Following the discussion on SSD endurance, SSD utilization and RAM consumption described above, DDv1 is compared with SSDI. Entries kept in the hash table by DDv1 are much bigger than the entries kept by SSDI. For SHA-256 hashes, DDv1 entry will have about 50 bytes, while SSDI entry has 8 bytes. Assuming 75% load factor (note that both solutions cannot use cuckoo hashing as it will increase the number of SSD reads during lookup), DDv1 hash table consumes 100 GB while hash table for SSDI only 16 GB. Certainly, SSDI needs additional 75 GB for keeping metadata files (DDv1 does not need additional space, as everything is contained in its hash table). FIG. 11 presents SSDI and DDv1 comparison. Bigger hash table increases degradation of SSD performance caused by sweeps. Still, the most important difference is in RAM needed for write cache. Entries kept in DDv1 hash table are bigger, what makes DDv1 write cache proportionally bigger. Overall, RAM needed by DDv1 is more than 6 times bigger than RAM needed by SSDI. That is especially important as 24 GB is greatly more than RAM needed by disk based solutions (NPL 1 and 2) and it is even more than the size of SSDI's hash table, which diminishes the usability of DDv1.

There are many disk based solutions of duplicate identification problem, but all of them have some weaknesses. The problem was first observed, and not solved, in Venti system (NPL 5). The most popular solution, described in NPL 1 and 2, employs in-memory bloom filters and stream prefetch. The stream prefetch does not work effectively if the order of duplicates is different than during the original write, which dramatically reduces write performance in such case.

MAD2 NPL 6 is another disk based solution which provides inline deduplication. Space of hashes is divided into tankers, hashes of chunks written in a time vicinity are places in the same tanker. Each tanker has its own in-memory bloom filter, a tanker is prefetched into memory when its chunks are identified as duplicates. This approach also relies on the fact that the order of duplicates is the same as the order of original writes and does not work for random duplicate.

Sparse Indexing (NPL 7) and Extreme Binning (NPL 8) rely on the similarity of data in subsequent backups. They do not compare a hash of a chunk being written to the system with hashes of all chunks written before, but only with the hashes from similar block-of-chunks. This makes deduplication unreliable: it aims to identify only majority of duplicates (it does not work when the order of duplicates is random).

Many disk-based solutions, including Hash Join (NPL 9), Debar (NPL 10), or Decentralized Deduplication (NPL 11), propose offline deduplication. Chunks are always written to disks, as if they were new, and there is an off-line process of checking and eliminating duplicates. In such solution all duplicated chunks need to be unnecessarily written during each backup, which has negative impact on performance.

Alphard, proposed in NPL 12, uses SSDs to provide a key-value store that effectively supports write-intensive workloads. Design goals of Alphard are different from that of the present invention, Alphard serves as a low latency chunks write cache for a disk-based storage system. Since Alphard keeps much fewer chunks than the disk-based system, the index of all chunks stored in Alphard can be kept in RAM.

The design of SSDI was loosely inspired by PBFilter (NPL 13 and 14) intended for indexing in DBMS. PBFIlter is also kept on SSD, but, instead of using hash table, organizes the index as append-only logs. The idea of using bloom filters to summarize write caches appears in NPL 15; however, the caches are not organized in a hierarchy and are kept on disks.

An interesting idea how to efficiently write very small blocks on a flash device appears in NPL 16. The idea could be incorporated in the SSDI design, however, SATA (which is commonly used by SSDs) does not expose the required interface.

(Conclusions)

The research in the present invention shows that it is enough to equip a 2u server with two commodity flash-based-SSDs to ultimately solve the disk-bottleneck problem during inline deduplication. The results achieved by SSDI and SSDI3lvl are promising. Furthermore, even better performance can be obtained by combining the proposed solutions with stream-prefetch, by using more SSD drives, or by using flash-based devices that can serve more random reads per second.

Primary storage is another area besides backup and archive storage where SSDI can be applied. Low latency of lookup operations even during random reads and writes is a huge advantage for the primary storage. As a result, SSDI can be one of the key enabling technologies for deduplication of primary storage.

Second Exemplary Embodiment

Figure 12:
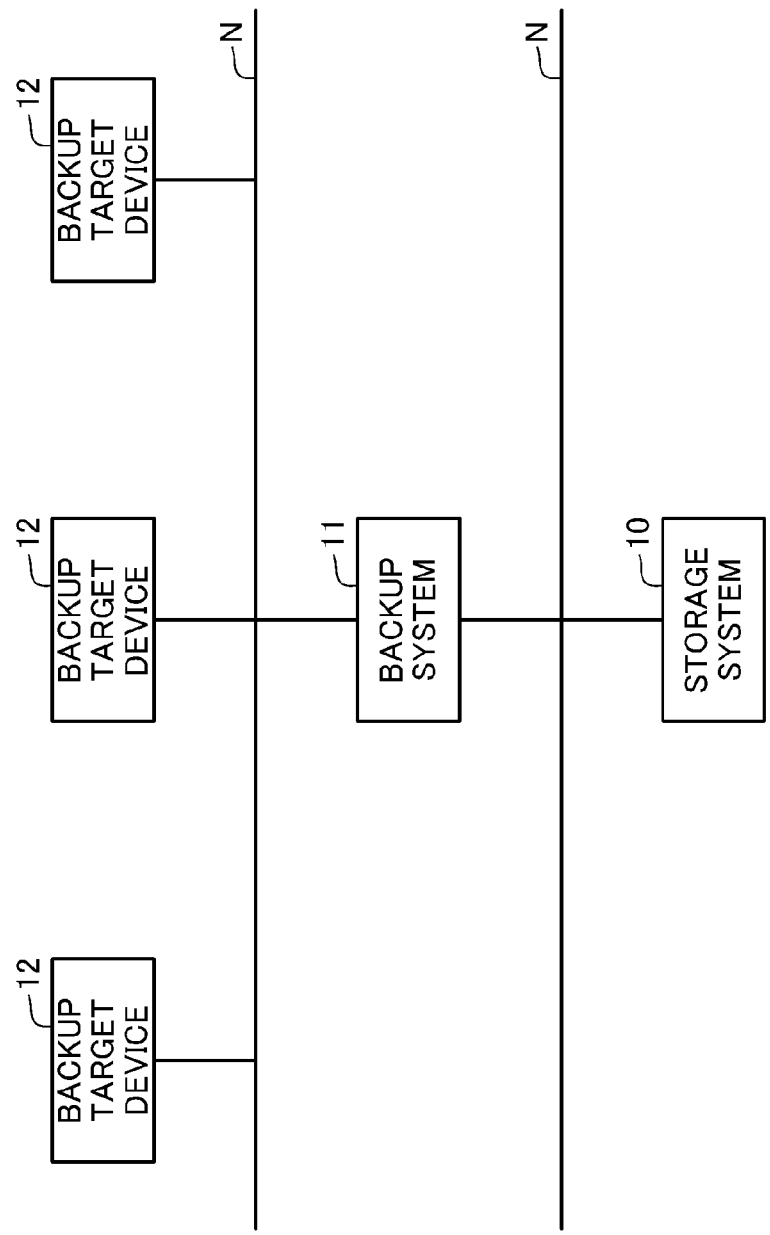
FIG. 12 is a block diagram showing the configuration of the entire system including a storage system of a second exemplary embodiment.
Figure 13:
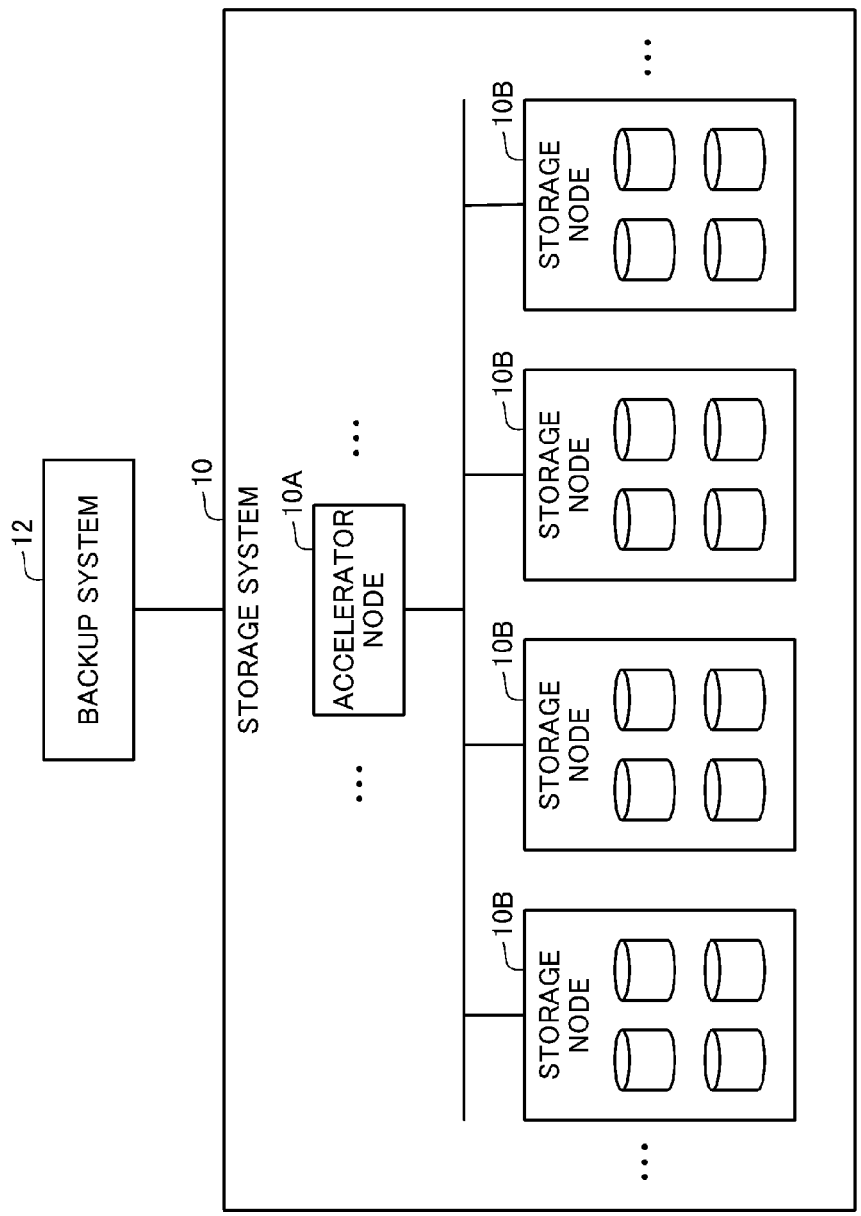
FIG. 13 is a block diagram schematically showing the configuration of the storage system of the second exemplary embodiment.
Figure 14:
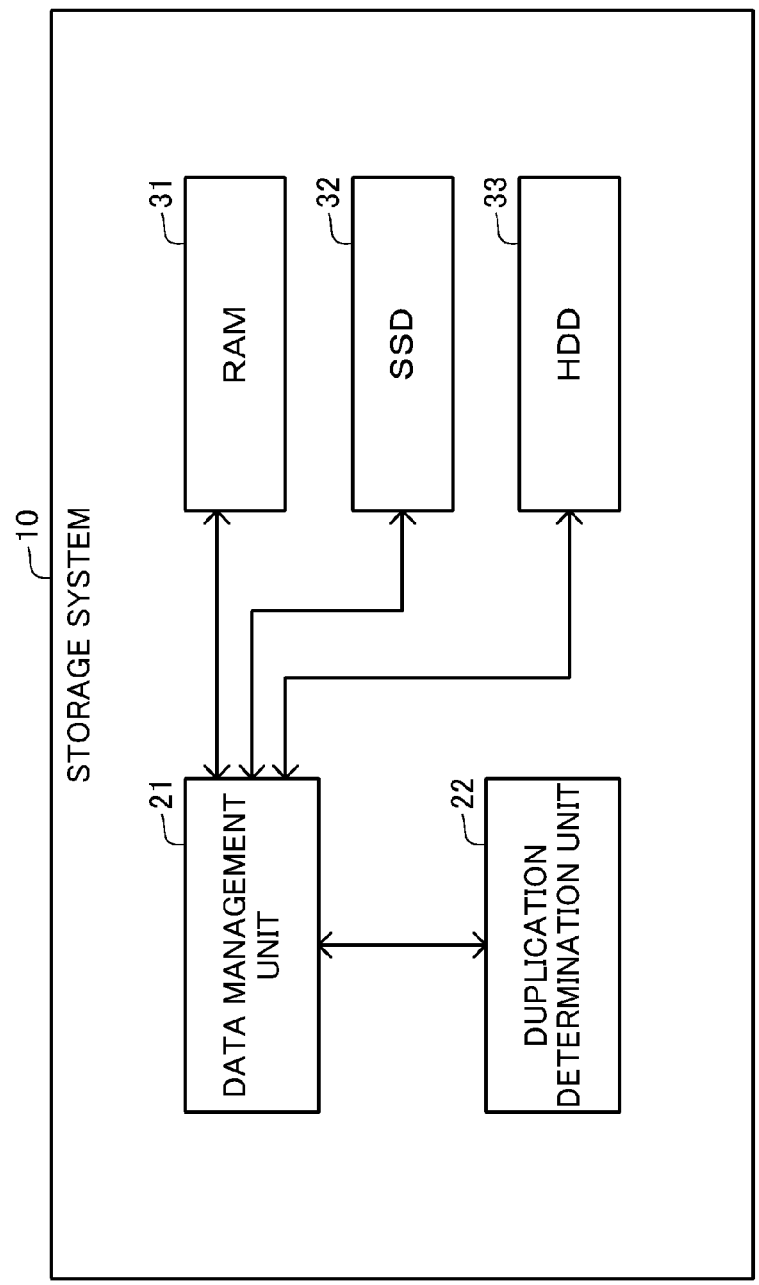
FIG. 14 is a function block diagram showing the configuration of the storage system of the second exemplary embodiment.

A second exemplary embodiment of the present invention will be described with reference to FIGS. 12 to 19. FIG. 12 is a block diagram showing the configuration of the whole system. FIG. 13 is a block diagram schematically showing a storage system, and FIG. 14 is a function block diagram showing the configuration. FIGS. 15 to 19 are explanation views for explaining the operation of the storage system.

This exemplary embodiment herein shows a case that the storage system is a system such as HYDRAstore and is configured by connecting a plurality of server computers. However, the storage system of the present invention is not limited to the configuration with a plurality of computers, and may be configured by one computer.

As shown in FIG. 12, a storage system 10 of the present invention is connected to a backup system 11 that controls a backup process via a network N. The backup system 11 acquires backup target data (storage target data) stored in a backup target device 12 connected via the network N, and requests the storage system 10 to store. Thus, the storage system 10 stores the backup target data requested to be stored as a backup.

As shown in FIG. 13, the storage system 10 of this exemplary embodiment employs a configuration that a plurality of server computers are connected. To be specific, the storage system 10 is equipped with an accelerator node 10A serving as a server computer that controls the storing/reproducing operation of the storage system 10, and a storage node 10B serving as a server computer equipped with a storage device that stores data. The number of the accelerator node 10A and the number of the storage node 10B are not limited to those shown in FIG. 13, and a configuration that more nodes 10A and more nodes 10B are connected may be employed.

Further, the storage system 10 of this exemplary embodiment is a content address storage system that divides data and makes the data redundant, distributes the data and stores into a plurality of storage devices, and specifies a storing position in which the data is stored by a unique content address set in accordance with the content of the data to be stored. This content address storage system will be described later.

Assuming the storage system 10 is one system, the configuration and the function of the storage system 10 will be described below. In other words, the configuration and the function of the storage system 10 described below may be included in either the accelerator node 10A or the storage node 10B. The storage system 10 is not limited to the configuration including the accelerator node 10A and the storage node 10B, as shown in FIG. 13. The storage system 10 may have any configuration and, for example, may be configured by one computer. Moreover, the storage system 10 is not limited to a content address storage system.

FIG. 14 shows a configuration of the storage system 10. As shown in this drawing, the storage system 10 is equipped with a RAM 31 as a main storage device which is an operating region for performing predetermined processes, similar to typical information processing devices, and a hard disk drive (HDD) 3 which is a first auxiliary storage device for storing backup target data to be stored. The storage system 10 is also equipped with a Solid State Drive (SSD) 32 as a second auxiliary storage device having a faster reading/writing speed than that of the HDD 33 in general (except for some processing such as writing of data in a relatively small size, for example). The RAM 31 has a faster reading/writing speed than those of the HDD 33 and the SSD 32.

Further, the storage system 10 also includes a data management unit 21 that manages storing position of data to be stored, and a duplication determination unit 22 that determines whether or not data to be newly stored has already been stored in the HDD 33.

Actually, the data management unit 21 and the duplication determination unit 22 are configured by programs installed in a plurality of arithmetic devices such as a CPU (Central Processing Unit) of the accelerator node 10A and a CPU of the storage node 10B shown in FIG. 13. Moreover, the HDD 33 is mainly configured of a storage device of the storage node 10B.

The abovementioned program is provided to the storage system 10, for example, in a state stored in a storage medium such as a CD-ROM. Alternatively, the program may be stored in a storage device of another server computer on the network and provided from the other server computer to the storage system 10 via the network.

Hereinafter, the configurations of the data management unit 21 and the duplication determination unit 22 will be described in detail. First, when the data management unit 21 receives an input of the backup target data A, which is stream data, as shown by arrow Y1 in FIG. 16, the data management unit 21 divides the backup target data A into predetermined capacities (e.g., 64 KB) of block data D, as shown by arrow Y2 in FIGS. 15 and 16. Then, based on the data content of this block data D, the data management unit 21 calculates a unique hash value H (feature data) representing the data content (arrow Y3). For example, a hash value H is calculated from the data content of the block data D by using a preset hash function. The process by the data management unit 21 is executed in the accelerator node 10A.

Then, by using the hash value H of the block data D of the backup target data A, the duplication determination unit 22 checks whether or not the block data D has already been stored in the storage device 30. To be specific, the hash value H and content address CA that represents the storing position of the block data D having already been stored are related and registered in an MFI (Main Fragment Index) file. Therefore, in the case where the hash value H of the block data D calculated before storage exists in the MFI file, the duplication determination unit 22 can determine that the block data D having the same content has already been stored (arrow Y4 in FIG. 16). In this case, the duplication determination unit 22 acquires a content address CA related to a hash value H within the MFI that coincides with the hash value H of the block data D before storage, from the MFI file. Then, the duplication determination unit 22 stores this content address CA as the content address CA of the block data D required to be stored. Alternatively, the duplication determination unit 22 may store another piece of address data further referring to the content address CA referring to the block data D that has already been stored, in a tree structure. Consequently, the already stored data referred to by using this content address CA is used as the block data D required to be stored, and it becomes unnecessary to store the block data D required to be stored. The duplication determination unit 22 performs duplication determination by using index data obtained by further performing hash computation on the hash value of the block data D. This will be described in detail below.

Figure 15:
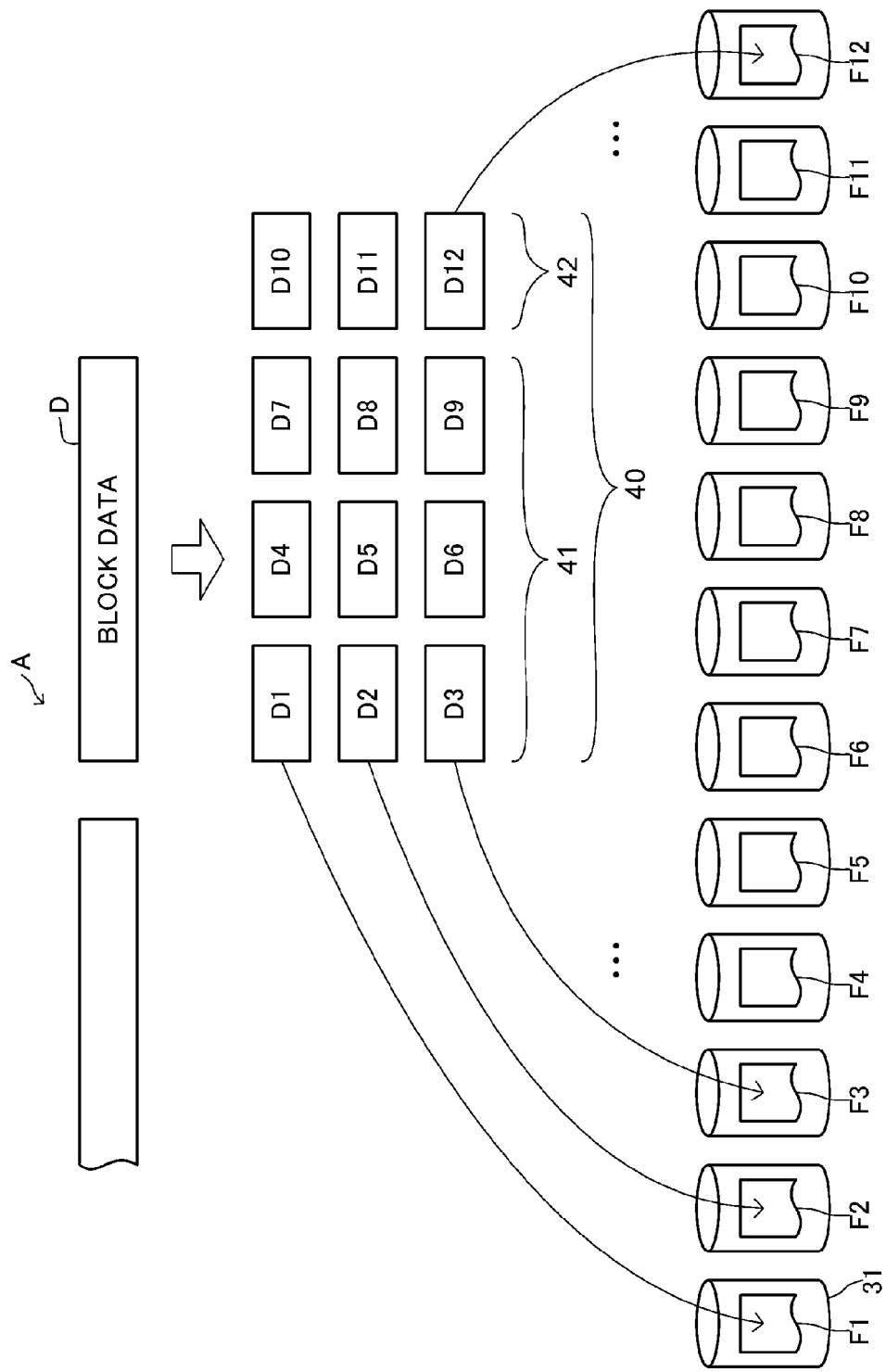
FIG. 15 is an explanation view for explaining an aspect of a data storage process in the storage system disclosed in FIG. 14.
Figure 16:
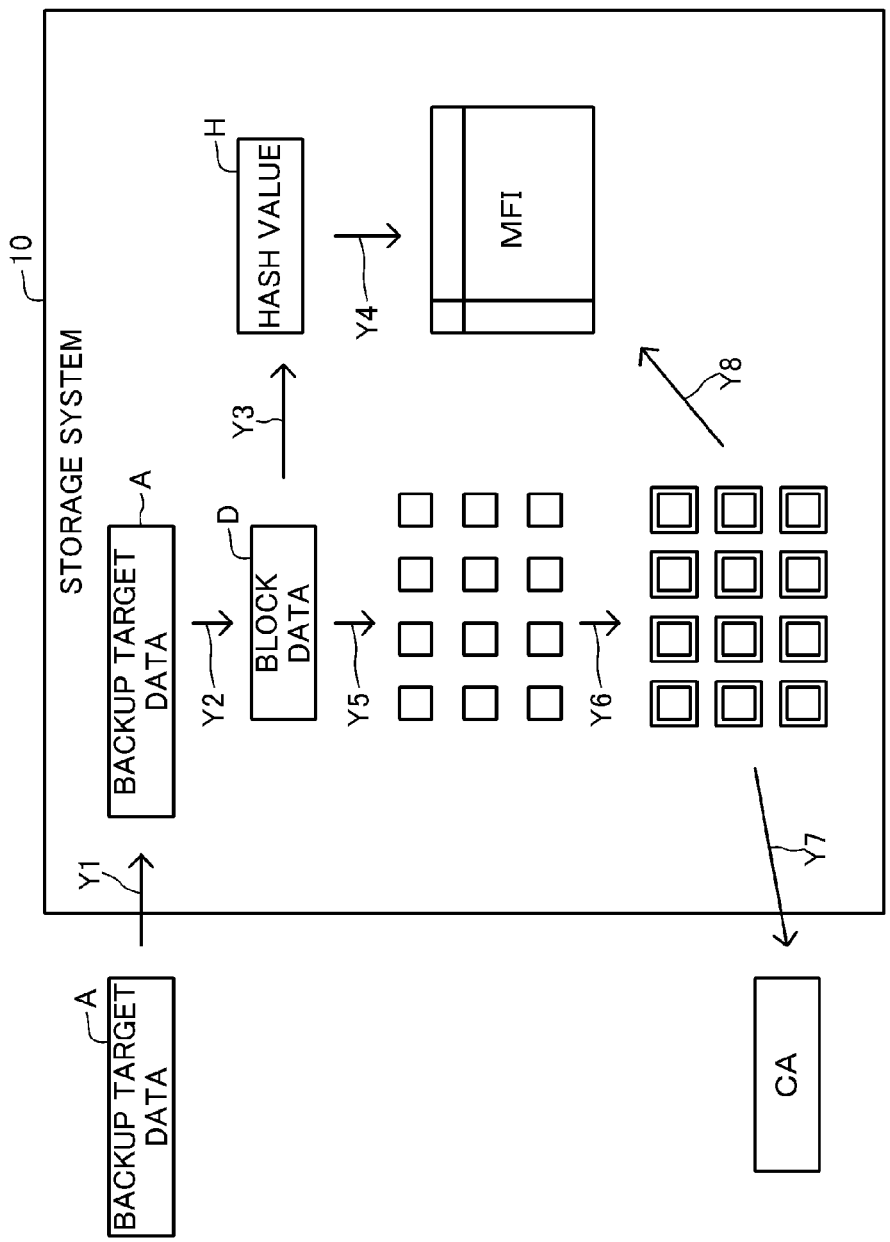
FIG. 16 is an explanation view for explaining the aspect of the data storage process in the storage system disclosed in FIG. 14.

Further, the data management unit 21 compresses block data D determined, by the duplication determination unit 22, that it has not been stored yet as described above, and divides the data into a plurality of pieces of fragment data having predetermined capacities as shown by arrow Y5 in FIG. 16. For example, as shown by reference numerals D1 to D9 in FIG. 15, the data management unit 21 divides the data into nine pieces of fragment data (division data 41). Moreover, the data management unit 21 generates redundant data so that the original block data can be restored even if some of the fragment data obtained by division are lost, and adds the redundant data to the fragment data 41 obtained by division. For example, as shown by reference numerals D10 to D12 in FIG. 15, the data management unit 21 adds three fragment data (redundant data 42). Thus, the data management unit 21 generates a data set 40 including twelve fragment data composed of the nine division data 41 and the three redundant data. The process by the data management unit 21 is executed by one storage node 10B.

Then, the data management unit 21 distributes and stores, one by one, the fragment data composing the generated data set into storage regions formed in the HDD 33. For example, as shown in FIG. 15, in the case where the twelve fragment data D1 to D12 are generated, the data management unit 21 stores one of the fragment data D1 to D12 into one of data storage files F1 to F12 (data storage regions) formed in the twelve HDD 33 (refer to arrow Y6 in FIG. 16).

Further, the data management unit 21 generates and manages a content address CA, which represents the storing positions of the fragment data D1 to D12 stored in the HDD 33 as described above, that is, the storing position of the block data D to be restored by the fragment data D1 to D12. To be specific, the data management unit 21 generates a content address CA by combining part (short hash) of a hash value H calculated based on the content of the stored block data D (e.g., the beginning 8 bytes in the hash value H) with information representing a logical storing position. Then, the data management unit 21 returns this content address CA to a file system within the storage system 10, namely, to the accelerator node 10A (arrow Y7 in FIG. 16). The accelerator node 10A then relates identification information such as the file name of the backup target data with the content address CA and manages them in the file system. At this time, the content address CA is stored in a metadata table formed in the SSD 32.

Figure 18:
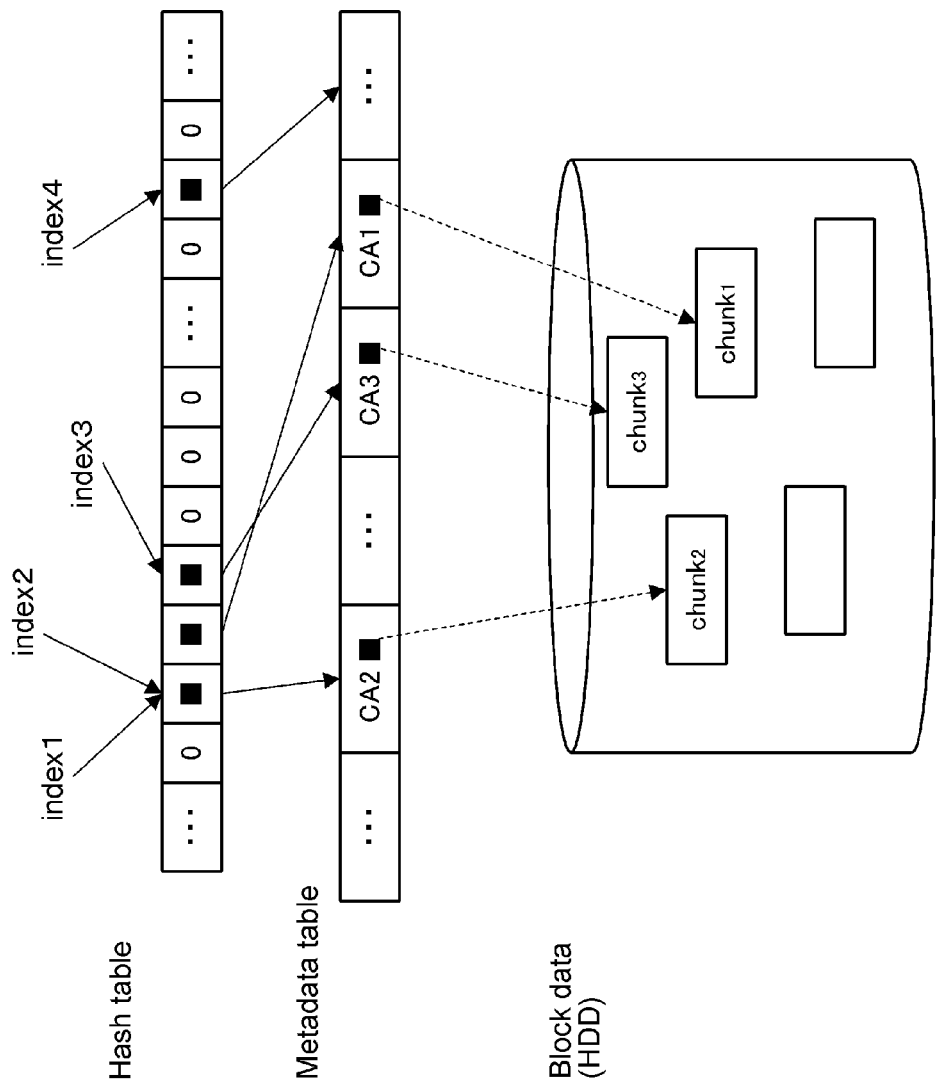
FIG. 18 shows an aspect of storing data in the second exemplary embodiment.

Further, the data management unit 21 generates and manages index data referring to the hash value (feature data) included in the content address representing the storing position of the stored block data D. Specifically, the data management unit 21 calculates a value obtained by further performing hash computation on the data content of the hash value of the block data D as index data and stores it in a hash table, and refers to the hash value of the block data D from the index data. The relation between the content address CA including the hash value and the index data is shown in FIG. 18.

As described above, the block data D to be stored in the HDD 33 is first referred to by the content address CA, and the content address CA is referred to by the index data in the hash table. As such, the duplication determination unit 22 can perform duplication determination by comparing the hash value of the block data D generated by dividing data to be newly stored with the hash value in the content address CA stored in the metadata table which can be reached by the index obtained by further performing hash computation on such hash value. It should be noted that the present invention is characterized in the method of storing the index data. This will be described in detail below.

Further, the data management unit 21 relates the content address CA of the block data D with the hash value H of the block data D, and the respective storage nodes 10B manages them in the MFI file.

Furthermore, the data management unit 21 executes a control of retrieving backup target data stored as described above. For example, when the storage system 10 accepts a retrieval request with a specific file designated (refer to arrow Y11 in FIG. 17), based on the file system, the data management unit 21 firstly designates a content address CA, which is composed of short hash as part of a hash value corresponding to the file relating to the retrieval request and information of a logical position (refer to arrow Y12 in FIG. 17). Then, the data management unit 21 checks whether or not the content address CA is registered in the MFI file (refer to arrow 13 in FIG. 17). If the content address CA is not registered, the requested data is not stored, so that the data management unit 21 returns an error response.

Figure 17:
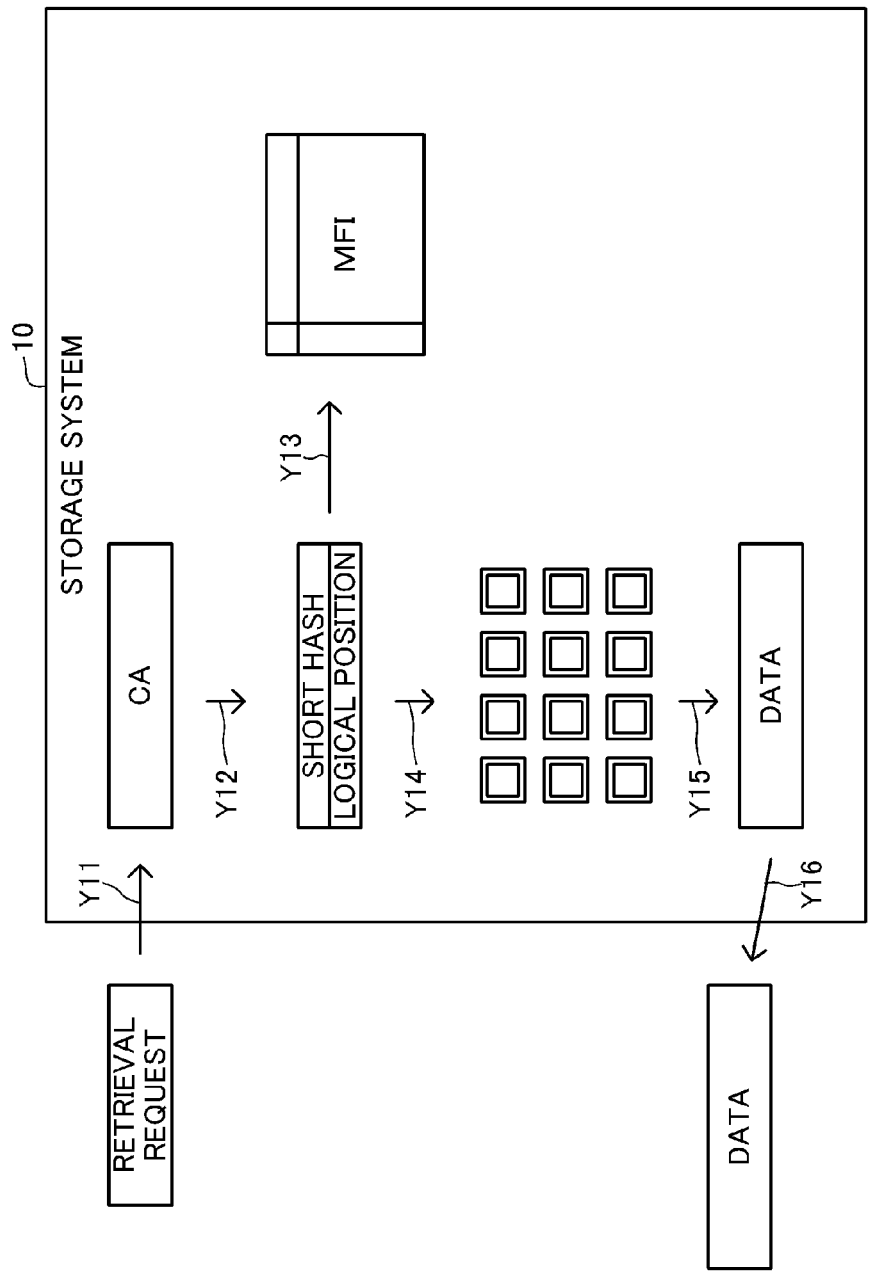
FIG. 17 is an explanation view for explaining an aspect of a data retrieval process in the storage system disclosed in FIG. 14.

On the other hand, if the content address CA relating to the retrieval request is registered, the data management unit 21 specifies a storing position designated by the content address CA, and retrieves each fragment data stored in the specified storing position as data requested to be retrieved (refer to arrow Y14 in FIG. 17). At this moment, if knowing the data storage files F1 to F12 storing the respective fragments and the storing position of one of the fragment data in the data storage files, the data management unit 21 can specify the storing positions of the other fragment data because the storing positions are the same.

Then, the data management unit 21 restores the block data D from the respective fragment data retrieved in response to the retrieval request (refer to arrow Y15 in FIG. 17). Moreover, the data management unit 21 connects a plurality of restored block data D to restore into a group of data like the file A, and returns to the accelerator node 10A that is controlling the retrieval (refer to arrow Y16 in FIG. 17).

Figure 19:
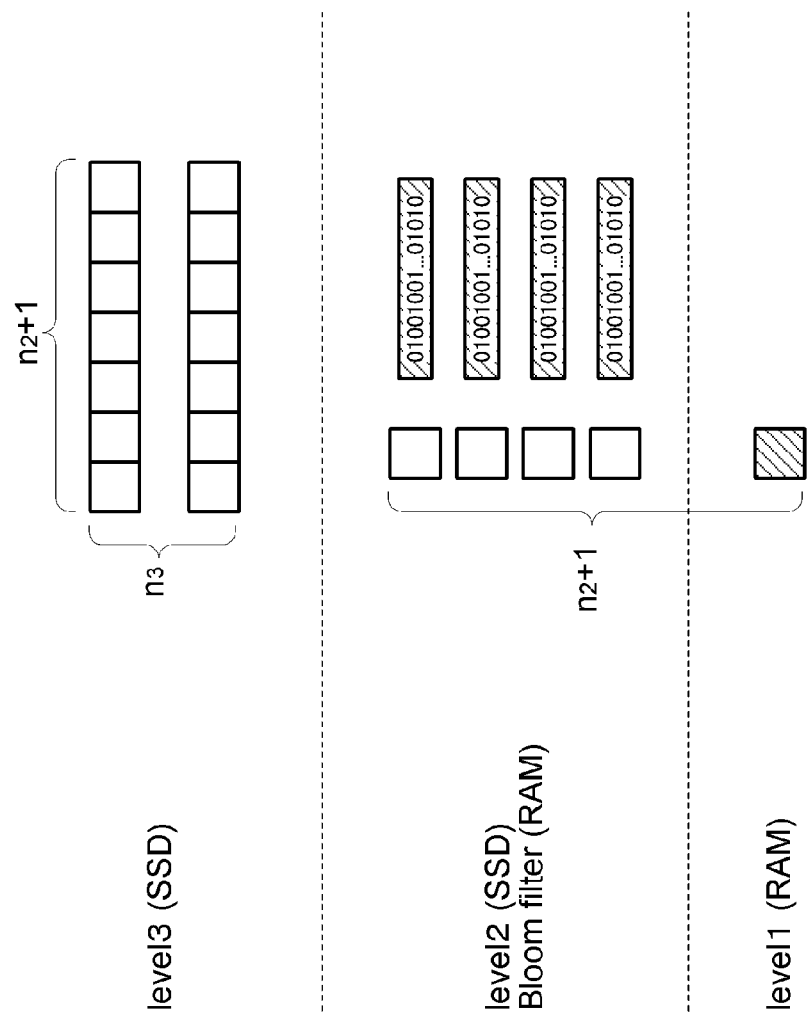
FIG. 19 shows an aspect of storing index data in the second exemplary embodiment.

When storing the block data D in the HDD 33 as described above, the data management unit 21 of the present invention stores index data, obtained by further performing hash computation on the hash value of the block data D, in the RAM 31 and the SSD 32 as shown in FIG. 19. This will be described in detail below.

First, as shown by diagonal lines in FIG. 19, the data management unit 21 stores index data in the RAM 31 with one entry being the upper limit, as level 1. With this process, as the amount of index data stored in the RAM 31 reaches the upper limit, when further storing index data, the data management unit 21 stores the index data, having been stored in the RAM 31, in the SSD 32 as level 2. At the same time, by deleting the index data stored in the RAM 31, as a space is formed in the RAM 31, the data management unit 21 stores the new index data. Although the case where the upper limit of storing index data in the RAM 31 at level 1 is one entry (unit) has been exemplary shown, a configuration in which more units of index data can be stored is also acceptable.

Then, the data management unit 21 repeatedly stores index data in the SSD 32 from the RAM 31 as level 2, until the amount reaches the upper limit of the amount of storage preset in the SSD 32 as level 2. For example, index data in a unit of $n_2$ is stored. At this moment, at level 2, the data management unit 21 stores, in the RAM 31, a bloom filter of each piece of index data stored in the SSD 32, as shown by the diagonal lines. It should be noted that the bloom filter is data (element data) calculated based on the data content of the index data stored in the SSD 32 at level 2, and is used to determine whether of not the index data exists in the SSD 32 at a high speed. Thus, the bloom filter is used for performing duplication determination on data to be newly written.

Then, when the number of index data stored in the SSD 23 at level 2 reaches $n_2$ which is the preset upper limit (of the amount), the $n_2$ pieces of index data stored in the SSD 32 at level 2 and a piece of index data stored in the RAM 31 are combined. Then, the combined ($n_2+1$) index data is again stored in the SSD 32 at level 3. At the same time, the data management unit 21 deletes the index data stored in the SSD 32 and the bloom filter stored in the RAM 31 at level 2, and one index data stored in the RAM 31 at level 1, respectively. Thereby, as spaces are formed in the RAM 31 at level 1 and in the SSD 32 at level 2, new index data can be stored. Then, when the number of index data stored in the SSD 32 at level 3 reaches the preset upper limit, that is, $n_3*(n_2+1)$ pieces (units), every index data is written in the sweep region.

While the case of combining the index data stored in the RAM 31 at level 1 in addition to the index data stored in the SSD 32 at level 2 when storing the data from the SSD 32 at level 2 to the SSD 32 at level 3, has been exemplary shown, the present invention is not limited to combining index data in the RAM 31. This means that it is possible to only combine pieces (units) of index data stored in the SSD 32 at level 2 and store them at level 3. Further, although the case of storing, in the RAM 31, the bloom filter of the index data stored in the SSD 32 at level 2 has been exemplary shown, it is not necessary to store the bloom filter.

<Supplementary Notes>

Figure 20:
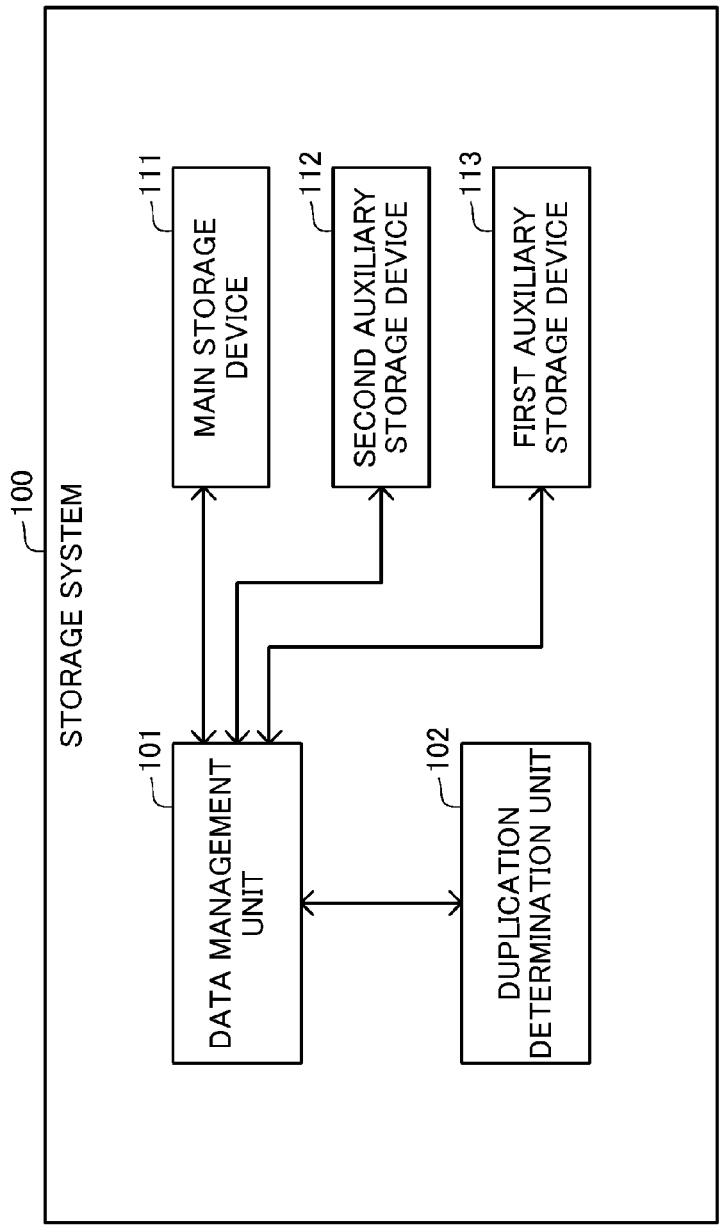
FIG. 20 is a block diagram showing the configuration of a storage system according to Supplementary Note 1.

The whole or part of the exemplary embodiments disclosed above can be described as the following supplementary notes. Outlines of the configurations of a storage system 100 the present invention (see FIG. 20), computer-readable medium storing a program, and an information processing method will be described below. However, the present invention is not limited to the configurations described below.

(Supplementary Note 1)

A storage system 100, comprising:

a first auxiliary storage device 113 for storing storage target data;

a second auxiliary storage device 112 having a higher data reading/writing speed than a data reading/writing speed of the first auxiliary storage device;

a main storage device 111 having a higher data reading/writing speed than the data reading/writing speeds of the first auxiliary storage device and the second auxiliary storage device;

a data management unit 101 that stores storage target data in the first auxiliary storage device, manages a storing position of the storage target data using feature data which is based on a data content of the storage target data, and refers to the feature data from index data which is based on a data content of the feature data; and a duplication determination unit 102 that uses the feature data based on a data content of storage target data to be newly stored and the index data based on the data content of the feature data to determine whether or not storage target data, which is identical to the storage target data to be newly stored, has already been stored in the first auxiliary storage device, wherein the data management unit 101 stores and keeps, in the main storage device, the index data based on the feature data by referring to the feature data of the storage target data stored in the first auxiliary storage device, and if the index data stored and kept in the main storage device reaches a preset amount, stores and keeps, in the second auxiliary storage device, the index data stored and kept in the main storage device, and deletes the index data stored and kept in the second auxiliary storage device from the main storage device.

(Supplementary Note 2)

The storage system, according to supplementary note 1, wherein if the index data stored and kept in the second auxiliary storage device reaches the preset amount, the data management unit combines a plurality of units of the index data stored and kept in the second auxiliary storage device, again stores and keeps the combined data in the second auxiliary storage device, and deletes the index data before being combined from the second auxiliary storage device.

(Supplementary Note 3)

The storage system, according to supplementary note 2, wherein the data management unit combines the plurality of units of the index data stored and kept in the second auxiliary storage device and the index data stored and kept in the main storage device and again stores the combined data in the second auxiliary storage device, and deletes the index data before being combined from the second auxiliary storage device and the main storage device.

(Supplementary Note 4)

The storage system, according to supplementary note 2, wherein the data management unit stores, in the main storage device, element data which is based on a data content of the index data used for determining whether or not there is the index data stored in the second auxiliary storage device.

(Supplementary Note 5)

The storage system, according to supplementary note 4, wherein when the data management unit combines the units of the index data stored in the second auxiliary storage device and again stores the combined data in the second auxiliary storage device, the data management unit releases the element data of the index data stored in the main storage device.

(Supplementary Note 6)

The storage system, according to supplementary note 1, wherein the first auxiliary storage device is a hard disk drive, and the second auxiliary storage device is a solid state drive (SSD).

(Supplementary Note 7)

A computer-readable medium storing a program comprising instructions for causing an information processing device to realize, the information processing device including a first auxiliary storage device for storing storage target data, a second auxiliary storage device having a higher data reading/writing speed than a data reading/writing speed of the first auxiliary storage device, and a main storage device having a higher data reading/writing speed than the data reading/writing speeds of the first auxiliary storage device and the second auxiliary storage device:

a data management unit that stores storage target data in the first auxiliary storage device, manages a storing position of the storage target data using feature data which is based on a data content of the storage target data, and refers to the feature data from index data which is based on a data content of the feature data; and a duplication determination unit that uses the feature data based on a data content of storage target data to be newly stored and the index data based on the data content of the feature data to determine whether or not storage target data, which is identical to the storage target data to be newly stored, has already been stored in the first auxiliary storage device, wherein the data management unit stores and keeps, in the main storage device, the index data based on the feature data by referring to the feature data of the storage target data stored in the first auxiliary storage device, and if the index data stored and kept in the main storage device reaches a preset amount, stores and keeps, in the second auxiliary storage device, the index data stored and kept in the main storage device, and deletes the index data stored and kept in the second auxiliary storage device from the main storage device.

(Supplementary Note 8)

The computer-readable medium storing the program according to supplementary note 7, wherein if the index data stored and kept in the second auxiliary storage device reaches the preset amount, the data management unit combines a plurality of units of the index data stored and kept in the second auxiliary storage device, again stores and keeps the combined data in the second auxiliary storage device, and deletes the index data before being combined from the second auxiliary storage device.

(Supplementary Note 9)

A data management method, in a storage system including a first auxiliary storage device for storing storage target data, a second auxiliary storage device having a higher data reading/writing speed than a data reading/writing speed of the first auxiliary storage device, and a main storage device having a higher data reading/writing speed than the data reading/writing speeds of the first auxiliary storage device and the second auxiliary storage device, the method comprising:

storing storage target data in the first auxiliary storage device, managing a storing position of the storage target data using feature data which is based on a data content of the storage target data, and managing the storage target data by referring to the feature data from index data which is based on a data content of the feature data; and using the feature data based on a data content of storage target data to be newly stored and the index data based on the data content of the feature data to determine whether or not storage target data, which is identical to the storage target data to be newly stored, has already been stored in the first auxiliary storage device, wherein the managing the storage target data includes storing and keeping, in the main storage device, the index data based on the feature data by referring to the feature data of the storage target data stored in the first auxiliary storage device, and if the index data stored and kept in the main storage device reaches a preset amount, storing and keeping, in the second auxiliary storage device, the index data stored and kept in the main storage device, and deleting the index data stored and kept in the second auxiliary storage device from the main storage device.

(Supplementary Note 10)

The data management method, according to supplementary note 9, wherein the managing the storage target data includes, if the index data stored and kept in the second auxiliary storage device reaches the preset amount, combining a plurality of units of the index data stored and kept in the second auxiliary storage device, again storing and keeping the combined data in the second auxiliary storage device, and deleting the index data before being combined from the second auxiliary storage device.

The invention claimed is:

1. A storage system, comprising:
a first auxiliary storage device for storing storage target data;
a second auxiliary storage device having a higher data reading/writing speed than a data reading/writing speed of the first auxiliary storage device;
a main storage device having a higher data reading/writing speed than the data reading/writing speeds of the first auxiliary storage device and the second auxiliary storage device;
a CPU (Central Processing Unit): wherein
the CPU stores storage target data in the first auxiliary storage device,
manages a storing position of the storage target data using feature data which is based on a data content of the storage target data,
manages data, by referring to the feature data from index data which is based on a data content of the feature data;
determines, by using the feature data based on a data content of storage target data to be newly stored and the index data based on the data content of the feature data, whether or not storage target data which is identical to the storage target data to be newly stored has already been stored in the first auxiliary storage device, and when managing the storage target data, stores and keeps, in the main storage device, the index data based on the feature data by referring to the feature data of the storage target data stored in the first auxiliary storage device, and if the index data stored and kept in the main storage device reaches a preset amount, stores and keeps, in the second auxiliary storage device, the index data stored and kept in the main storage device, and deletes the index data stored and kept in the second auxiliary storage device from the main storage device, and combines a plurality of units of the index data stored and kept in the second auxiliary storage device and the index data stored and kept in the main storage device and again stores the combined data in the second auxiliary storage device, and deletes the index data before being combined from second auxiliary storage device and the main storage device.

2. The storage system, according to claim 1, wherein the managing the storage target data comprises storing, in the main storage device, element data which is based on a data content of the index data used for determining whether or not there is the index data stored in the second auxiliary storage device.

3. The storage system, according to claim 2, wherein when the CPU combines units of the index data stored in the second auxiliary storage device and again stores the combined data in the second auxiliary storage device, the data management unit releases the element data of the index data stored in the main storage device.

4. The storage system, according to claim 1, wherein the first auxiliary storage device is a hard disk drive, and the second auxiliary storage device is a solid state drive (SSD).

5. A non-transitory computer-readable medium storing a program comprising instructions which when executed implement an information processing device, the information processing device including a first auxiliary storage device for storing storage target data, a second auxiliary storage device having a higher data reading/writing speed than a data reading/writing speed of the first auxiliary storage device, and a main storage device having a higher data reading/writing speed than the data reading/writing speeds of the first auxiliary storage device and the second auxiliary storage device, wherein when the instructions are executed by a CPU (Central Processing Unit) cause the CPU to perform processing comprising:

managing the storage target data, storing storage target data in the first auxiliary storage device, managing a storing position of the storage target data using feature data which is based on a data content of the storage target data, and managing data, by referring to the feature data from index data which is based on a data content of the feature data; and determining, by using the feature data based on a data content of storage target data to be newly stored and the index data based on the data content of the feature data, whether or not storage target data which is identical to the storage target data to be newly stored has already been stored in the first auxiliary storage device, wherein when managing the storage target data stores and keeps, in the main storage device, the index data based on the feature data by referring to the feature data of the storage target data stored in the first auxiliary storage device, and if the index data stored and kept in the main storage device reaches a preset amount, stores and keeps, in the second auxiliary storage device, the index data stored and kept in the main storage device, and deletes the index data stored and kept in the second auxiliary storage device from the main storage device, and combining a plurality of units of the index data stored and kept in the second auxiliary storage device and the index data stored and kept in the main storage device and again stores the combined data in the second auxiliary storage device, and deletes the index data before being combined from the second auxiliary storage device and the main storage device.

6. A data management method, in a storage system including a first auxiliary storage device for storing storage target data, a second auxiliary storage device having a higher data reading/writing speed than a data reading/writing speed of the first auxiliary storage device, and a main storage device having a higher data reading/writing speed than the data reading/writing speeds of the first auxiliary storage device and the second auxiliary storage device, the method comprising:

storing storage target data in the first auxiliary storage device, managing a storing position of the storage target data using feature data which is based on a data content of the storage target data, and managing the storage target data by referring to the feature data from index data which is based on a data content of the feature data; and using the feature data based on a data content of storage target data to be newly stored and the index data based on the data content of the feature data to determine whether or not storage target data which is identical to the storage target data to be newly stored has already been stored in the first auxiliary storage device, wherein the managing the storage target data includes storing and keeping, in the main storage device, the index data based on the feature data by referring to the feature data of the storage target data stored in the first auxiliary storage device, and if the index data stored and kept in the main storage device reaches a preset amount, storing and keeping, in the second auxiliary storage device, the index data stored and kept in the main storage device, and deleting the index data stored and kept in the second auxiliary storage device from the main storage device, and combining a plurality of units of the index data stored and kept in the second auxiliary storage device and the index data stored and kept in the main storage device and again stores the combined data in the second auxiliary storage device, and deletes the index data before being combined from the second auxiliary storage device and the main storage device.

* * * * *

UNITED STATES PATENT AND TRADEMARK OFFICE
CERTIFICATE OF CORRECTION

| | | |
|---|---|---|
| PATENT NO. | : 8,924,663 B2 | Page 1 of 1 |
| APPLICATION NO. | : 13/640628 | |
| DATED | : December 30, 2014 | |
| INVENTOR(S) | : Jerzy Szczepkowski, Michal Welnicki and Cezary Dubnicki | |

It is certified that error appears in the above-identified patent and that said Letters Patent is hereby corrected as shown below:

In the Drawings

Drawing Sheet 1 of 20: Delete ".K" and insert -- 1K --

In the Specification

Column 8, Line 1: Delete "$_{key4}$" and insert -- $key_4$ --

Column 10, Line 16: Delete "(n2+1)" and insert -- $(n_2+1)$ --

In the Claims

Column 23, Line 21: In Claim 1, delete "from second" and insert -- from the second --

Signed and Sealed this
Sixteenth Day of June, 2015

Michelle K. Lee
*Director of the United States Patent and Trademark Office*